US009117394B2

(12) United States Patent
Ono

(10) Patent No.: US 9,117,394 B2
(45) **Date of Patent: *Aug. 25, 2015**

(54) IMAGE DISPLAY DEVICE AND DRIVING METHOD THEREOF

(71) Applicant: JOLED INC., Kandanishikicho, Chiyoda-ku (JP)

(72) Inventor: Shinya Ono, Osaka (JP)

(73) Assignee: JOLED INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/054,134

(22) Filed: Oct. 15, 2013

(65) Prior Publication Data

US 2014/0035470 A1 Feb. 6, 2014

Related U.S. Application Data

(63) Continuation of application No. 13/082,660, filed on Apr. 8, 2011, now Pat. No. 8,587,569, which is a continuation of application No. PCT/JP2010/001536, filed on Mar. 5, 2010.

(30) Foreign Application Priority Data

Mar. 6, 2009 (JP) ................................ 2009-054206

(51) Int. Cl.
*G06F 3/038* (2013.01)
*G09G 5/00* (2006.01)

(Continued)

(52) U.S. Cl.
CPC ................ *G09G 3/12* (2013.01); *G09G 3/3233* (2013.01); *G09G 2300/0819* (2013.01);

(Continued)

(58) Field of Classification Search
CPC .................. G09G 3/3233; G09G 3/12; G09G 2310/0218; G09G 2310/0221; G09G 2310/0251; G09G 2320/043
USPC ..................... 345/204–215, 690–699, 76–83; 315/169.1–169.4
See application file for complete search history.

(56) References Cited

U.S. PATENT DOCUMENTS 7,397,447 B2 7/2008 Matsumoto
7,492,336 B2 2/2009 Kim (Continued)

FOREIGN PATENT DOCUMENTS

JP 2002-196721 7/2002
JP 2002-214645 7/2002

(Continued)

OTHER PUBLICATIONS

Extended European Search Report in European Patent Application No. 10748537.7, dated Jun. 12, 2012.

(Continued)

*Primary Examiner* — Amr Awad
*Assistant Examiner* — Roberto Flores
(74) *Attorney, Agent, or Firm* — Greenblum & Bernstein, P.L.C.

(57) ABSTRACT

An image display device includes luminescence pixels arranged in rows and columns. The image display device includes a first and second signal lines, first control lines, and at least two drive blocks. Each drive block is composed of luminescence pixels in at least two rows. Each luminescence pixel includes a luminescence element and a current controller. Each luminescence pixel that belongs to a $k^{th}$ drive block further includes a first switch provided between the first signal line and the current controller. Each luminescence pixel that belongs to a $(k+1)^{th}$ drive block further includes a second switch provided between the second signal line and the current controller. Each first control line is connected to all of the luminescence pixels in one of the drive blocks and not connected to the luminescence pixels in a different drive block.

14 Claims, 20 Drawing Sheets

(51) Int. Cl.
*G09G 3/30* (2006.01)
*G09G 3/12* (2006.01)
*G09G 3/32* (2006.01)

(52) U.S. Cl.
CPC ................ *G09G 2300/0852* (2013.01); *G09G 2300/0861* (2013.01); *G09G 2300/0876* (2013.01); *G09G 2310/0218* (2013.01); *G09G 2310/0221* (2013.01)

(56) References Cited

U.S. PATENT DOCUMENTS

| | | | | |
|---|---|---|---|---|
| 2003/0095087 | A1 | 5/2003 | Libsch et al. | |
| 2004/0233141 | A1 | 11/2004 | Matsumoto | |
| 2004/0239596 | A1* | 12/2004 | Ono et al. | 345/76 |
| 2005/0007316 | A1* | 1/2005 | Akimoto et al. | 345/76 |
| 2005/0017930 | A1* | 1/2005 | Kobayashi et al. | 345/76 |
| 2005/0168491 | A1 | 8/2005 | Takahara et al. | |
| 2005/0219166 | A1 | 10/2005 | Kim | |
| 2005/0280616 | A1 | 12/2005 | Miwa et al. | |
| 2006/0017668 | A1 | 1/2006 | Shirasaki et al. | |
| 2006/0187153 | A1 | 8/2006 | Nathan et al. | |
| 2006/0221015 | A1 | 10/2006 | Shirasaki et al. | |
| 2007/0216613 | A1* | 9/2007 | Ogura et al. | 345/76 |
| 2008/0043005 | A1 | 2/2008 | Kanda | |
| 2008/0246785 | A1* | 10/2008 | Shirasaki et al. | 345/690 |
| 2009/0122047 | A1 | 5/2009 | Yamamoto et al. | |
| 2009/0189924 | A1 | 7/2009 | Ogura | |
| 2009/0219234 | A1 | 9/2009 | Yamamoto et al. | |
| 2009/0244055 | A1 | 10/2009 | Asano et al. | |
| 2010/0007645 | A1 | 1/2010 | Ono | |
| 2010/0073265 | A1* | 3/2010 | Hirai et al. | 345/55 |

FOREIGN PATENT DOCUMENTS

| | | |
|---|---|---|
| JP | 2003-186439 | 7/2003 |
| JP | 2003-195809 | 7/2003 |
| JP | 2004-287349 | 10/2004 |
| JP | 2004-318093 | 11/2004 |
| JP | 2006-284716 | 10/2006 |
| JP | 2007-155754 | 6/2007 |
| JP | 2008-083680 | 4/2008 |
| JP | 2008-122633 | 5/2008 |
| JP | 2009-015276 | 1/2009 |
| JP | 2009-139928 | 6/2009 |
| JP | 2009-204881 | 9/2009 |
| JP | 2010-054564 | 3/2010 |
| WO | 2008/152817 | 12/2008 |

OTHER PUBLICATIONS

International Search Report in PCT/JP2010/001536, mailing date of Jun. 1, 2010.

* cited by examiner

Pixel in odd block

Pixel in even block

Pixel in odd block

Pixel in even block

Pixel in odd block

Pixel in even block

Pixel in odd block

Pixel in even block

IMAGE DISPLAY DEVICE AND DRIVING METHOD THEREOF

CROSS REFERENCE TO RELATED APPLICATION(S)

This is a continuation application of U.S. patent application Ser. No. 13/082,660, filed on Apr. 8, 2011, which is a continuation application of PCT application No. PCT/JP2010/001536 filed on Mar. 5, 2010, designating the United States of America. The disclosures of these documents, including the specifications, drawings, and claims, are incorporated herein by reference in their entireties.

The disclosure of Japanese Patent Application No. 2009-054206 filed on Mar. 6, 2009 including the specification, drawings, and claims is incorporated herein by reference in its entirety.

BACKGROUND OF THE INVENTION

1. Field of the Invention

The present invention relates to image display devices and driving methods thereof, and particularly to an image display device using current-driven luminescence elements, and a driving method thereof.

2. Description of the Related Art

Image display devices using organic electroluminescence (EL) elements are well-known as image display devices using current-driven luminescence elements. An organic EL display device using such self-luminous organic EL elements does not require backlights needed in a liquid crystal display device and is best suited for increasing device thinness. Furthermore, since viewing angle is not restricted, practical application as a next-generation display device is expected. Furthermore, the organic EL elements used in the organic EL display device are different from liquid crystal cells which are controlled according to the voltage applied thereto, in that the luminance of the respective luminescence elements is controlled according to the value of the current flowing thereto.

In the organic EL display device, the organic EL elements included in the pixels are normally arranged in rows and columns. In an organic EL display device referred to as a passive-matrix organic EL display device, an organic EL element is provided at each crosspoint between row electrodes (scanning lines) and column electrodes (data lines), and such organic EL elements are driven by applying a voltage equivalent to a data signal, between a selected row electrode and the column electrodes.

On the other hand, in an organic EL display device referred to as an active-matrix organic EL display device, a switching thin film transistor (TFT) is provided in each crosspoint between scanning lines and data lines, the gate of a drive element is connected to the switching TFT, the switching TFT is turned ON through a selected scanning line so as to input a data signal from a signal line to the drive element, and an organic EL element is driven by such drive element.

Unlike in the passive-matrix organic EL display device where, only during the period in which each of the row electrodes (scanning lines) is selected, does the organic EL element connected to the selected row electrode produce luminescence, in the active-matrix organic EL display device, it is possible to cause the organic EL element to produce luminescence until a subsequent scan (selection), and thus a reduction in display luminance is not incurred even when the duty ratio increases. Therefore, the active-matrix organic EL display device can be driven with low voltage and thus allows for reduced power consumption. However, in the active-matrix organic EL display device, due to variation in the characteristics of the drive transistors, the luminance of the organic EL elements are different among the respective pixels even when the same data signal is supplied, and thus there is the disadvantage of the occurrence of luminance unevenness.

In response to this problem, for example, Japanese Unexamined Patent Application Publication No. 2008-122633 (Patent Reference 1) discloses a method of compensating for the variation of characteristics for each pixel using a simple pixel circuit, as a method of compensating for the luminance unevenness caused by the variation in the characteristics of the drive transistors.

FIG. 18 is a block diagram showing the configuration of a conventional image display device disclosed in Patent Reference 1. An image display device 500 shown in the figure includes a pixel array unit 502 and a drive unit which drives the pixel array unit 502. The pixel array unit 502 includes scanning lines 701 to 70*m* disposed on a row basis, and signal lines 601 to 60*n* disposed on a column basis, luminescence pixels 501 each of which is disposed on a part at which both a scanning line and a signal line cross, and power supply lines 801 to 80*m* disposed on a row basis. Furthermore, the drive unit includes a signal selector 503, a scanning line drive unit 504, and a power supply line drive unit 505.

The scanning line drive unit 504 performs line-sequential scanning of the luminescence pixels 501 on a per row basis, by sequentially supplying control signals on a horizontal cycle (1 H) to each of the scanning lines 701 to 70*m*. The power supply line drive unit 505 supplies, to each of the power supply lines 801 to 80*m*, power source voltage that switches between a first voltage and a second voltage, in accordance with the line-sequential scanning. The signal selector 503 supplies, to the signal lines 601 to 60*n* that are in columns, a reference voltage and a luminance signal voltage which serves as an image signal, switching between the two voltages in accordance with the line-sequential scanning.

Here, two each of the respective signal lines 601 to 60*n* in columns are disposed per column; one of the signal lines supplies the reference voltage and the signal voltage to the luminescence pixels 501 in an odd row, and the other of the signal lines supplies the reference voltage and the signal voltage to the luminescence pixels 501 in an even row.

FIG. 19 is a circuit configuration diagram for a luminescence pixel included in the conventional image display device disclosed in Patent Reference 1. It should be noted that the figure shows the luminescence pixel 501 in the first row and the first column. The scanning line 701, the power supply line 801, and the signal lines 601 are provided to this luminescence pixel 501. It should be noted that one out of the two lines of the signal lines 601 is connected to this luminescence pixel 501. The luminescence pixel 501 includes a switching transistor 511, a drive transistor 512, a holding capacitor 513, and a luminescence element 514. The switching transistor 511 has a gate connected to the scanning line 701, one of a source and a drain connected to the signal line 601, and the other connected to the gate of the drive transistor 512. The drive transistor 512 has a source connected to the anode of the luminescence element 514 and a drain connected to the power supply line 801. The luminescence element 514 has a cathode connected to a grounding line 515. The holding capacitor 513 is connected to the source and gate of the drive transistor 512.

In the above-described configuration, the supply line drive unit 505 switches the voltage of the power supply line 801, from a first voltage (high-voltage) to a second voltage (low-voltage), when the voltage of the signal line 601 is the reference voltage. Likewise, when the voltage of the signal line 601 is the reference voltage, the scanning line drive unit 504 sets the voltage of the scanning line 701 to an "H" level and causes the switching transistor 511 to be in a conductive state so as to apply the reference voltage to the gate of the drive transistor 512 and set the source of the drive transistor 512 to the second voltage. With the above-described operation, preparation for the correction of a threshold voltage Vth of the drive transistor 512 is completed. Next, in the correction period before the voltage of the signal line 601 switches from the reference voltage to the signal voltage, the supply line drive unit 505 switches the voltage of the power supply line 801, from the second voltage to the first voltage, and causes a voltage equivalent to the threshold voltage Vth of the drive transistor 512 to be held in the holding capacitor 513. Next, the supply line drive unit 505 sets the voltage of the switching transistor 511 to the "H" level and causes the signal voltage to be held in the holding capacitor 513. Specifically, the signal voltage is added to the previously held voltage equivalent to the threshold voltage Vth of the drive transistor 512, and written into the holding capacitor 513. Then, the drive transistor 512 receives a supply of current from the power supply line 801 to which the first voltage is being applied, and supplies the luminescence element 514 with a drive current corresponding to the held voltage.

In the above-described operation, the period of time during which the reference voltage is applied to the respective signal lines is prolonged through the placement of two of the signal lines 601 in every column. This secures the correction period for holding the voltage equivalent to the threshold voltage Vth of the drive transistor 512 in the holding capacitor 513.

FIG. 20 is an operation timing chart for the image display device disclosed in Patent Reference 1. The figure describes, sequentially from the top, the signal waveforms of: the scanning line 701 and the power supply line 801 of the first line; the scanning line 702 and the power supply line 802 of the second line; the scanning line 703 and the power supply line 803 of the third line; the signal line allocated to the luminescence pixel of an odd row; and the signal line allocated to the luminescence pixel of an even row. The scanning signal applied to the scanning lines sequentially shifts 1 line for every 1 horizontal period (1 H). The scanning signal applied to the scanning lines for one line includes two pulses. The time width of the first pulse is long at 1 H or more. The time width of the second pulse is narrow and is part of 1 H. The first pulse corresponds to the above-described threshold correction period, and the second pulse corresponds to a signal voltage sampling period and a mobility correction period. Furthermore, the power source pulse supplied to the power supply lines also shifts 1 line for every 1 H cycle. In contrast, the signal voltage is applied once every 2 H to the respective signal lines, and thus it is possible to ensure that the period of time during which the reference voltage is applied is 1 H or more.

In this manner, in the conventional image display device disclosed in Patent Reference 1, even when there is a variation in the threshold voltage Vth of the drive transistor 512 for each luminescence pixel, by ensuring a sufficient threshold correction period, the variation is canceled on a luminescence pixel basis, and unevenness in the luminance of an image is inhibited.

SUMMARY OF THE INVENTION

However, in the conventional image display device disclosed in Patent Reference 1, there is frequent turning ON and OFF of the signal level of the scanning lines and power supply lines provided to each of the luminescence pixel rows. For example, the threshold correction period needs to be set for each of the luminescence pixel rows. Furthermore, when sampling luminance signal voltage from a signal line via a switching transistor, luminescence production periods need to be provided successively. Therefore, the threshold correction timing and luminescence production timing for each pixel row needs to be set. As such, since the number of rows increases with an increase in the area of a display panel, the signals outputted from each drive circuit increases and the frequency for the signal switching thereof rises, and the signal output load of the scanning line drive circuit and the power supply line drive circuit increases.

Furthermore, in the conventional image display device disclosed in Patent Reference 1, the correction period for the threshold voltage Vth of the drive transistor is under 2 H, and thus there is a limitation for an image display device in which high-precision correction is required.

In view of the aforementioned problem, the present invention has as an object to provide an image display device having decreased drive circuit output load and improved display quality.

In order to achieve the aforementioned object, the image display device according to an aspect of the present invention is an image display device including luminescence pixels arranged in rows and columns, the image display device including: a first power source line and a second power source line; a first signal line and a second signal line for supplying the luminescence pixels with a signal voltage that determines luminance of the luminescence pixels; scanning lines, each for one of the rows; and first control lines, wherein the luminescence pixels compose at least two drive blocks, each including luminescence pixels in at least two of the rows, each of the luminescence pixels includes: a luminescence element that includes luminescence terminals, one of the luminescence terminals being connected to the second power source line, the luminescence element producing a luminance according to a flow of a signal current corresponding to the signal voltage; and a current controller connected to the first power source line, an other of the luminescence terminals, and a corresponding one of the first control lines, the current controller being configured to convert the signal voltage into the signal current, each of the luminescence pixels in a $k^{th}$ one of the drive blocks further includes: a first switch including a first switch gate connected to a corresponding one of the scanning lines, one of a first switch source and a first switch drain being connected to the first signal line, and an other of the first switch source and the first switch drain being connected to the current controller, the first switch switchably interconnecting the first signal line and the current controller, each of the luminescence pixels that belong to a $(k+1)^{th}$ one of the drive blocks further includes: a second switch including a second switch gate connected to a corresponding one of the scanning lines, one of a second switch source and a second switch drain being connected to the second signal line, and an other of the second switch source and the second switch drain being connected to the current controller, the second switch switchably interconnecting the second signal line and the current controller, each of the first control lines is connected to the luminescence pixels in a same one of the drive blocks and not connected to the luminescence pixels in different ones of the drive blocks, k is a positive integer, and a threshold voltage correction period of the $(k+1)^{th}$ drive block is provided in a signal voltage storing period of the $k^{th}$ drive block.

According to the image display device and the driving method thereof according to the present invention, the drive transistor threshold voltage correction periods as well as the timings thereof can be made uniform within a drive block, and thus the number of times that the signal level is switched from ON to OFF and from OFF to ON can be reduced and thus reducing the load on the driver which drives the respective circuits of the luminescence pixels. In addition, through the above-described forming of drive blocks and the two signal lines provided for each luminescence pixel column, the drive transistor threshold voltage correction period can take a large part of a 1-frame period, and thus a highly precise drive current flows to the luminescence elements and image display quality improves.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Figure 1:
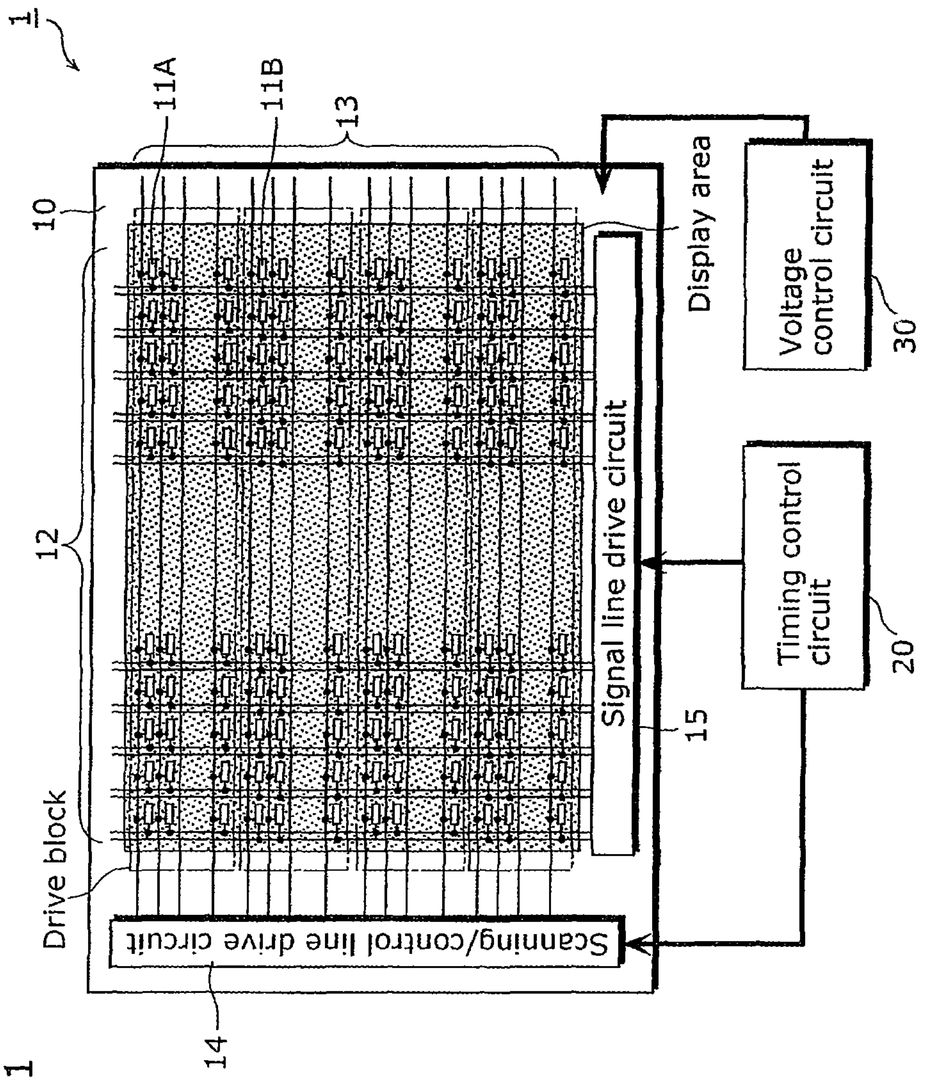
FIG. 1 is a block diagram showing the electrical configuration of an image display device according to a first embodiment of the present invention.

An image display device according to an aspect of the present invention is an image display device including luminescence pixels arranged in rows and columns, the image display device including: a first power source line and a second power source line; a first signal line and a second signal line for supplying the luminescence pixels with a signal voltage that determines luminance of the luminescence pixels; scanning lines, each for one of the rows; and first control lines, wherein the luminescence pixels compose at least two drive blocks, each including luminescence pixels in at least two of the rows, each of the luminescence pixels includes: a luminescence element that includes luminescence terminals, one of the luminescence terminals being connected to the second power source line, the luminescence element producing a luminance according to a flow of a signal current corresponding to the signal voltage; and a current controller connected to the first power source line, an other of the luminescence terminals, and a corresponding one of the first control lines, the current controller being configured to convert the signal voltage into the signal current, each of the luminescence pixels in a $k^{th}$ one of the drive blocks further includes: a first switch including a first switch gate connected to a corresponding one of the scanning lines, one of a first switch source and a first switch drain being connected to the first signal line, and an other of the first switch source and the first switch drain being connected to the current controller, the first switch switchably interconnecting the first signal line and the current controller, each of the luminescence pixels that belong to a $(k+1)^{th}$ one of the drive blocks further includes: a second switch including a second switch gate connected to a corresponding one of the scanning lines, one of a second switch source and a second switch drain being connected to the second signal line, and an other of the second switch source and the second switch drain being connected to the current controller, the second switch switchably interconnecting the second signal line and the current controller, each of the first control lines is connected to the luminescence pixels in a same one of the drive blocks and not connected to the luminescence pixels in different ones of the drive blocks, k is a positive integer, and a threshold voltage correction period of the $(k+1)^{th}$ drive block is provided in a signal voltage storing period of the $k^{th}$ drive block.

With this configuration, the timings for the first control signal lines can be made uniform within a drive block. Therefore, the load on the driver outputting the signals for controlling the drive current flowing to the luminescence elements is decreased. Furthermore, through the above-described forming of drive blocks and the two signal lines provided for each luminescence pixel column, the control operation period of the current controller performed through the first control lines can occupy a large part of a 1-frame period, and thus a highly precise drive current flows to the luminescence elements and image display quality can be improved.

Furthermore, in an image display device according to an aspect of the present invention, the current controller includes a drive transistor that includes one of a drive transistor source and a drive transistor drain that is connected to the other of the luminescence terminals and converts the signal voltage applied between a drive transistor gate and the drive transistor source into a drain current, the first switch is a switching transistor, and the other of the first switch source and the first switch drain is connected to the drive transistor, the second switch is a switching transistor, and the other of the second switch source and the second switch drain is connected to the drive transistor gate, and the current controller further includes: a first capacitor that includes first capacitor terminals, one of the first capacitor terminals being connected to the drive transistor gate, the other of the first capacitor terminals being connected to the drive transistor source; and a second capacitor that includes second capacitor terminals, one of the second capacitor terminals being connected to the drive transistor source, the other of the second capacitor terminals being connected to the corresponding one of the first control lines.

With this configuration, the drive transistor threshold voltage correction periods as well as the timings thereof can be made uniform within a drive block. Furthermore, through the above-described forming of drive blocks and the two signal lines provided for each luminescence pixel column, the drive transistor threshold voltage correction period can take a large part of a 1-frame period, and thus a highly precise drive current flows to the luminescence elements and image display quality improves.

Furthermore, an image display device according to an aspect of the present invention further includes: second control lines, wherein the current controller further includes: a third switch that includes a third switch gate connected to a corresponding one of the second control lines, one of a third switch source and a third switch drain being connected to the other of the first capacitor terminals, the other of the third switch source and the third switch drain being connected to the drive transistor source.

According to the present aspect, the luminescence pixel circuit to which the third switch, the first capacitor, and the second capacitor are provided, and the arrangement of the control lines, scanning lines, and signal lines to the respective luminescence pixels that have been formed into drive blocks allow the drive transistor threshold voltage correction periods as well as the timings thereof to be made uniform within the same drive block. Therefore, the load on the driver which outputs signals for controlling current paths, and controls signal voltages is decreased. In addition, through the above-described forming of drive blocks and the two signal lines arranged for every luminescence pixel column, the drive transistor threshold voltage correction period can take a large part of a 1 frame period Tf which is the time in which all the luminescence pixels are rewritten. This is because the threshold voltage correction period is provided in the (k+1)th drive block in the period in which the luminance signal is sampled in the kth drive block. Therefore, the threshold voltage correction period is not divided on a per luminescence pixel row basis, but is divided on a per drive block basis. Therefore, a long relative threshold voltage correction period can be set with respect to one frame period, without allowing luminescence duty to decrease with the increase in the display area. With this, a drive current based on luminance signal voltage that has been corrected with a high degree of precision flows to the luminescence elements, and thus image display quality improves.

Furthermore, an image display device according to an aspect of the present invention further includes: a driver that drives the luminescence pixels by controlling the first signal line, the second signal line, the first control lines, the second control lines, and the scanning lines, wherein the driver is configured to: sequentially cause a non-conductive state between the first signal line and the drive transistor gate of each of the luminescence pixels included in the $k^{th}$ drive block, by sequentially applying a reference voltage from the first signal line to the driver transistor gate of each of the luminescence pixels included in the $k^{th}$ drive block; simultaneously apply an initializing voltage from one of the first control lines to the driver transistor source of each of the luminescence pixels included in the $k^{th}$ drive block; simultaneously apply the reference voltage from the first signal line to the drive transistor gate of each of the luminescence pixels included in the $k^{th}$ drive block; simultaneously cause a non-conductive state between the first capacitor and the drive transistor source of each of the luminescence pixels included in the $k^{th}$ drive block, by applying a voltage for turning OFF the third switch of each of the luminescence pixels included in the $k^{th}$ drive block to the corresponding one of the second control lines; simultaneously cause the non-conductive state between the first signal line and the drive transistor gate of each of the luminescence pixels included in the $k^{th}$ drive block, by applying a voltage for turning OFF the first switch of each of the luminescence pixels in the $k^{th}$ drive block to corresponding ones of the scanning lines; sequentially cause a non-conductive state between the second signal line and the drive transistor gate of each of the luminescence pixels included in the $(k+1)^{th}$ drive block, by sequentially applying the reference voltage from the second signal line to the drive transistor gate of each of the luminescence pixels included in the $(k+1)^{th}$ drive block; simultaneously apply the initializing voltage from an other of the first control lines to the driver transistor source of each of the luminescence pixels included in the $(k+1)^{th}$ drive block; simultaneously apply the reference voltage from the second signal line to the drive transistor gate of each of the luminescence pixels included in the $(k+1)^{th}$ drive block; simultaneously cause a non-conductive state between the first capacitor and the drive transistor source of each of the luminescence pixels included in the $(k+1)^{th}$ drive block, by applying the voltage for turning OFF the third switch of each of the luminescence pixels included in the $(k+1)^{th}$ drive block to the corresponding one of the second control lines; and simultaneously cause the non-conductive state between the second signal line and the drive transistor gate of each of the luminescence pixels included in the (k+1) th drive block, by applying a voltage for turning OFF the second switch to corresponding ones of the scanning lines.

According to the present aspect, the driver controlling the voltages the first signal lines, the second signal lines, the first control lines, the second control lines, and the scanning lines controls the aforementioned threshold correction period, signal voltage writing period, and luminescence production period.

Furthermore, an image display device according to an aspect of the present invention further includes: second control lines, wherein the current controller further includes: a fourth switch that includes a fourth switch gate connected to a corresponding one of the second control lines, a fourth switch source and a fourth switch drain being provided between the first power source line and the other of the luminescence terminals, and switches the drain current of the drive transistor ON and OFF.

With this, the turning ON and OFF of the drain current of the drive transistor can be controlled, and thus the luminescence production operation of the luminescence elements can be performed independently of the timing of the application of the signal voltage to the drive transistors.

Furthermore, an image display device according to an aspect of the present invention further includes: a driver that drives the luminescence pixels by controlling the first signal line, the second signal line, the first control lines, the second control lines, and the scanning lines, wherein the driver is configured to: simultaneously stop an application of a voltage to the drive transistor of each of the luminescence pixels included in the $k^{th}$ drive block; simultaneously apply a reference voltage from the first signal line to the drive transistor gate of each of the luminescence pixels included in the $k^{th}$ drive block; simultaneously apply an initializing voltage from one of the first control lines to the drive transistor source of each of the luminescence pixels included in the $k^{1th}$ drive block; simultaneously apply a predetermined voltage to the drive transistor drain of each of the luminescence pixels included in the $k^{th}$ drive block, by applying a voltage for turning ON the fourth switch of each of the luminescence pixels included in the $k^{th}$ drive block to the corresponding one of the second control lines; stop the application of the predetermined voltage to the drive transistor drain of each of the luminescence pixels included in the $k^{th}$ drive block, by applying a voltage for turning OFF the fourth switch of each of the luminescence pixels included in the $k^{th}$ drive block to the corresponding one of the second control lines; simultaneously cause a non-conductive state between the first signal line and the drive transistor gate of each of the luminescence pixels included in the $k^{th}$ drive block, by applying a voltage for turning OFF the first switch of each of the luminescence pixels included in the $k^{th}$ drive block to corresponding ones of the scanning lines; simultaneously stop an application of a voltage to the drive transistor of each of the luminescence pixels included in the $(k+1)^{th}$ drive block; simultaneously apply the reference voltage from the second signal line to the drive transistor gate of each of the luminescence pixels included in the $(k+1)^{th}$ drive block; simultaneously apply the initializing voltage from an other of the first control lines to the drive transistor source of each of the luminescence pixels included in the $(k+1)^{th}$ drive block; simultaneously apply a predetermined voltage to the drive transistor drain of each of the luminescence pixels included in the $(k+1)^{th}$ drive block, by applying the voltage for turning ON the fourth switch of each of the luminescence pixels included in the $(k+1)^{th}$ drive block to the corresponding one of the second control lines; simultaneously stop the application of the predetermined voltage to the drive transistor drain of each of the luminescence pixels included in the $(k+1)^{th}$ drive block, by applying the voltage for turning OFF the fourth switch of each of the luminescence pixels included in the $(k+1)^{th}$ drive block to the corresponding one of the second control lines; and simultaneously cause a non-conductive state between the second signal line and the drive transistor gate of each of the luminescence pixels included in the $(k+1)^{th}$ drive block, by applying the voltage for turning OFF the second switch of each of the luminescence pixels included in the $(k+1)^{th}$ drive block to corresponding ones of the scanning lines.

According to the present aspect, the driver controlling the voltages the first signal lines, the second signal lines, the first control lines, the second control lines, and the scanning lines controls the aforementioned threshold correction period, signal voltage writing period, and luminescence production period.

Furthermore, in an image display device according to an aspect of the present invention, each of the second control lines is connected to the luminescence pixels in a same one of the drive blocks and not connected to the luminescence pixels in different ones of the drive blocks.

Accordingly, by simultaneous controlling the fourth switches within the same block through the second control lines, simultaneous luminescence production within the same block can be implemented, and the load on the driver outputting the signal from the second control lines is decreased.

Furthermore, in an image display device according to an aspect of the present invention, the fourth switch is a switching transistor that includes one of the fourth switch source and the fourth switch drain being connected to the other of the driving transistor source and the driving transistor drain, and the other of the fourth switch source and the fourth switch drain being connected to the first power source line.

With this configuration, the drive transistor threshold voltage correction periods as well as the timings thereof can be made uniform within a drive block. Furthermore, by providing the fourth switches and the second capacitors, the luminescence production periods as well as the timings thereof can be made uniform within a drive block. Therefore, the load on the driver which outputs the signals for controlling the conductive state and non-conductive state of the respective switches and the signals for controlling the turning ON and OFF of the voltage application to the drive transistors is reduced. Furthermore, through the above-described forming of drive blocks and the two signal lines provided for each luminescence pixel column, the drive transistor threshold voltage correction period can take a large part of a 1-frame period, and thus a highly precise drive current flows to the luminescence elements and image display quality improves.

Furthermore, in an image display device according to an aspect of the present invention, the signal voltage includes a luminance signal voltage for causing the luminescence element to produce the luminescence, and a reference voltage for causing the first capacitor to store a voltage corresponding to a threshold voltage of the drive transistor, the image display device further includes: a signal line driver that outputs the signal voltage to the first signal line and the second signal line; and a timing controller that controls a timing at which the signal line driver outputs the signal voltage, and the timing controller is configured to mutually and exclusively output the luminance signal voltage and the reference voltage to the first signal line and the second signal line.

According to the present aspect, the threshold voltage correction period is provided in the (k+1)th drive block, in the period in which the luminance signal is sampled in the kth drive block. Therefore, the threshold voltage correction period is not divided on a per luminescence pixel row basis, but is divided on a per drive block basis. Therefore, a longer relative threshold voltage correction period can be set as the display area is increased.

Furthermore, in an image display device according to an aspect of the present invention, where a period of time for rewriting all of the luminescence pixels is Tf, and a total number of the drive blocks is N, a period of time for detecting a threshold voltage of the drive transistor is at most Tf/N.

Furthermore, the present invention can be realized not only as an image display device including such characteristic units but also as a driving method of an image display device having such characteristic units included in the image display device as steps.

First Embodiment

The image display device in the present embodiment is an image display device including luminescence pixels arranged in rows and columns, the image display device including: a first signal line and a second signal line each provided on a per luminescence pixel column basis; and a first control line provided on a per luminescence pixel column basis, wherein the luminescence pixels compose two or more drive blocks each including rows of the luminescence pixels, each of the luminescence pixels includes: a drive transistor; a first capacitor having both terminals connected to a gate and a source of the drive transistor; a luminescence element connected to the source of the drive transistor; a fourth switch which switches a drain current of the drive transistor ON and OFF; and a second capacitor provided between the source of the drive transistor and the first control line, each of the luminescence pixels that belong to a kth drive block (k is a positive integer) further includes a first switch provided between the first signal line and the gate of the drive transistor, each of the luminescence pixels that belong to a (k+1)th drive block further includes a second switch provided between the second signal line and the gate of the drive transistor, and each of the first control lines is shared by all of the luminescence pixels in a same one of the drive blocks. With this, the drive transistor threshold voltage correction periods as well as the luminescence periods can be made uniform within the drive block. Therefore, the load on the driver is decreased. Furthermore, since a long threshold voltage correction period can be taken with respect to one frame period, image display quality is improved.

Hereinafter, an embodiment of the present invention shall be described with reference to the Drawings.

FIG. 1 is a block diagram showing the electrical configuration of an image display device according to a first embodiment of the present invention. An image display device 1 in the figure includes a display panel 10, a timing control circuit 20, and a voltage control circuit 30. The display panel 10 includes plural luminescence pixels 11A and 11B, a signal line group 12, a control line group 13, a scanning/control line drive circuit 14, and a signal line drive circuit 15.

The luminescence pixels 11A and 11B are arranged in rows and columns on the display panel 10. Here, the luminescence pixels 11A and 11B compose two or more drive blocks each of which is one drive block made up of plural luminescence pixel rows. The luminescence pixels 11A compose odd drive blocks and the luminescence pixels 11B compose even drive blocks.

The signal line group 12 includes plural signal lines disposed in each of the luminescence pixel columns. Here, two signal lines are disposed in each of the luminescence pixel columns, the luminescence pixels of odd drive blocks are connected to one of the two signal lines, and the luminescence pixels of even drive blocks are connected to the other of the two signal lines.

The control line group 13 includes scanning lines and control lines, with each of the scanning lines and each of the control lines disposed on a per luminescence pixel basis.

The scanning/control line drive circuit 14 drives the circuit element of each luminescence pixel by outputting a scanning signal to the respective scanning lines of the control line group 13 and outputting a control signal to the respective control lines of the control line group 13.

The signal line drive circuit 15 drives the circuit element of each luminescence pixel by outputting a luminance signal or a reference signal to the respective signal lines of the signal line group 12.

The timing control circuit 20 controls the output timing of scanning signals and control signals outputted from the scanning/control line drive circuit 14. Furthermore, the timing control circuit 20 controls the timing for the outputting of luminance signals or reference signals outputted from the signal line drive circuit 15.

The voltage control circuit 30 controls the voltage level of the scanning signals and the control signals outputted from the scanning/control line drive circuit 14.

Figure 2A:
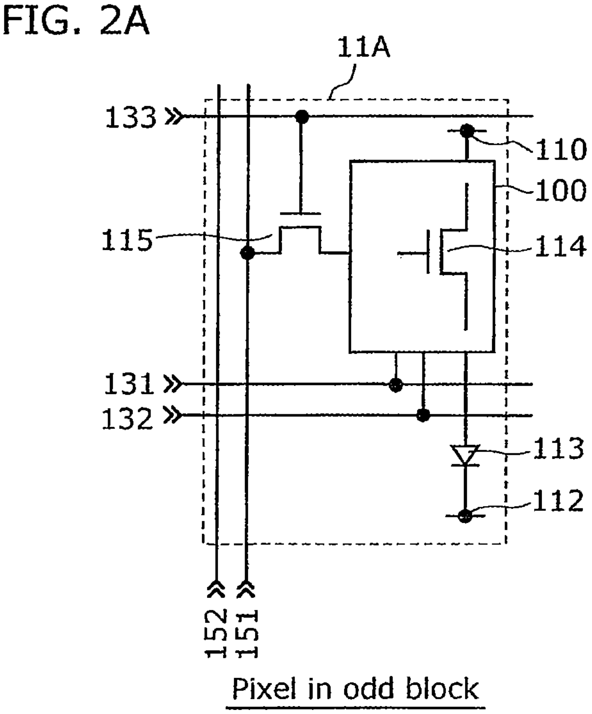
FIG. 2A is a circuit configuration diagram of a luminescence pixel of an odd drive block in the image display device according to the first embodiment of the present invention.
Figure 2B:
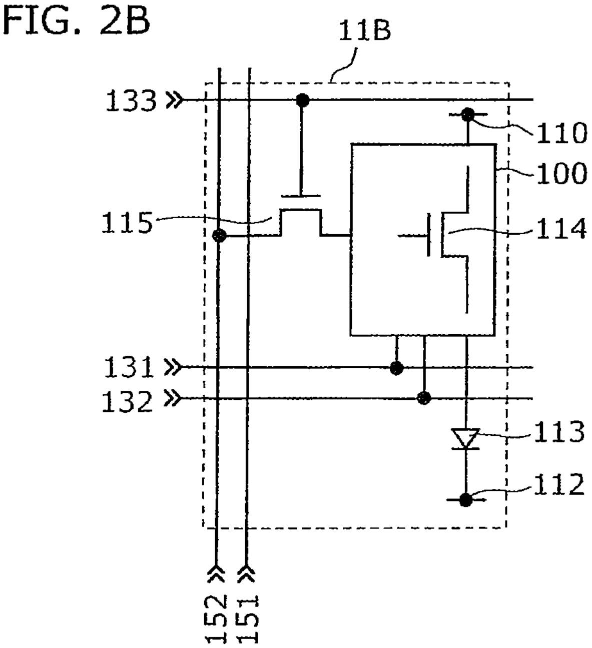
FIG. 2B is a circuit configuration diagram of a luminescence pixel of an even drive block in the image display device according to the first embodiment of the present invention.

FIG. 2A is a circuit configuration diagram of a luminescence pixel of an odd drive block in the image display device according to the first embodiment of the present invention, and FIG. 2B is a circuit configuration diagram of a luminescence pixel of an even drive block in the image display device according to the first embodiment of the present invention. Each of the luminescence pixels 11A and 11B shown in FIG. 2A and FIG. 2B, respectively, include: an organic electroluminescence (EL) element 113; a current control unit 100 including a drive transistor 114; a switching transistor 115; a second control line 131; a first control line 132; a scanning line 133; a first signal line 151; and a second signal line 152.

The current control unit 100 is connected to a power source line 110 which is the first power source line, the anode of the organic EL element 113, the second control line 131, the first control line 132, and a terminal of one of the source and the drain of the switching transistor 115. According to this configuration, the current control unit 100 has a function of converting the signal voltage supplied from the first signal line 151 or the second signal line 152 into a signal current which is a drain current of the drive transistor 114.

The organic EL element 113 is for example a luminescence element having a cathode connected to a power source line 112, which is the second power source line, and an anode connected to the current control unit 100. The organic EL element 113 produces luminescence according to the flow of the drive current of the drive transistor 114.

With the application of a voltage corresponding to a signal voltage, between the source and the drain, the drive transistor 114 converts such voltage to a corresponding drain current. Subsequently, the drive transistor 114 supplies this drain current, as a drive current, to the organic EL element 113. The drive transistor 114 is configured of, for example, an n-type thin film transistor (n-type TFT).

The switching transistor 115 has a gate connected to the scanning line 133, and one of a source and a drain connected to the current control unit 100. Furthermore, the other of the source and the drain is connected to the first signal line 151 and functions as a first switch in the luminescence pixel 11A in the odd drive block, and is connected to the second signal line 152 and functions as a second switch in the luminescence pixel 11B in the even drive block.

Figure 3A:
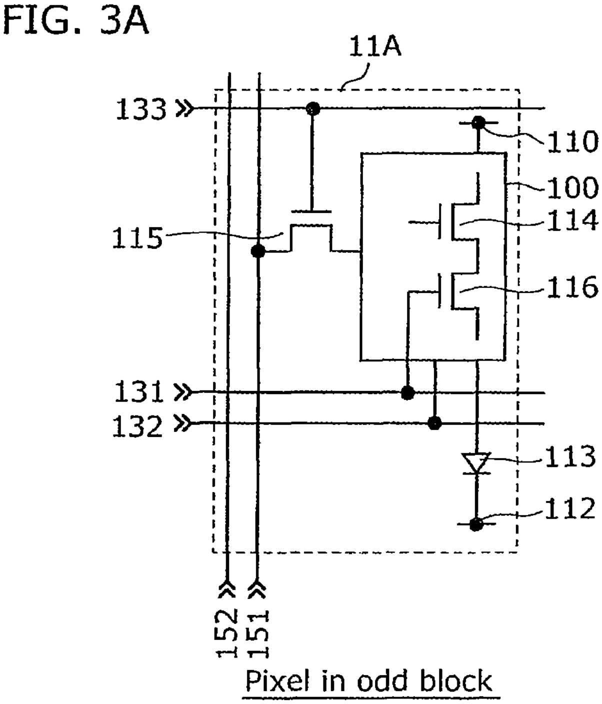
FIG. 3A is a specific circuit configuration diagram of a luminescence pixel of an odd drive block in the image display device according to the first embodiment of the present invention.
Figure 3B:
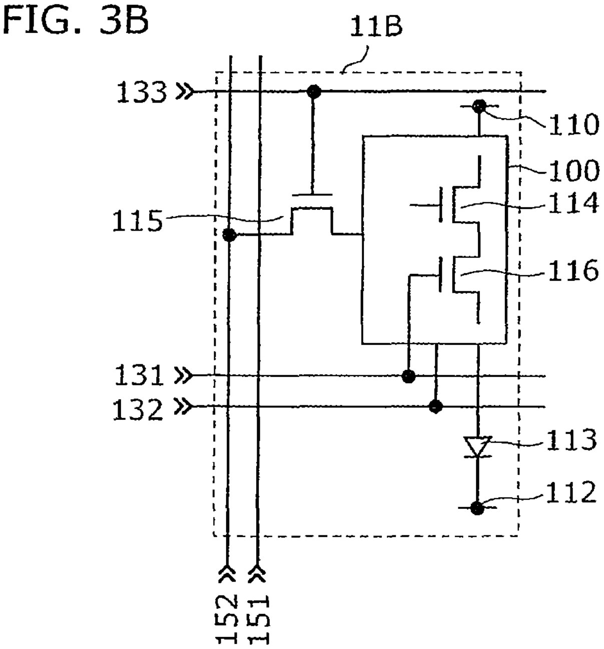
FIG. 3B is a specific circuit configuration diagram of a luminescence pixel of an even drive block in the image display device according to the first embodiment of the present invention.

Furthermore, it is preferable that the current control unit 100 have a function of turning the aforementioned signal current ON and OFF. FIG. 3A is a specific circuit configuration diagram of a luminescence pixel of an odd drive block in the image display device according to the first embodiment of the present invention, and FIG. 3B is a specific circuit configuration diagram of a luminescence pixel of an even drive block in the image display device according to the first embodiment of the present invention. Compared with the current control unit 100 shown in FIG. 2A and FIG. 2B, the current control unit 100 shown in FIG. 3A and FIG. 3B is different in that a switching transistor 116 is implemented as a constituent element of the current control unit 100. Hereinafter, description of points that overlap with the configuration of the image display device shown in FIG. 2A and FIG. 2B shall be omitted.

In FIG. 3A and FIG. 3B, the switching transistor 116 is a fourth switch having a gate connected to the second control line 131, and the other of a source and a drain connected to the power source line 110 which is a positive power source line. The switching transistor 116 has a function of turning the drain current of the drive transistor 114 ON and OFF.

It should be noted that it is sufficient that the source and the drain of the switching transistor 116 are connected between the power source line 110 and the anode of the organic EL element. With this arrangement, the drain current of the drive transistor 114 can be turned ON and OFF. The drive transistors 115 and 116 are each configured of, for example, an n-type thin film transistor (n-type TFT).

Furthermore, it is preferable that the current control unit 100 have a function of holding a voltage corresponding to the aforementioned signal voltage, and a function of programming (detecting and holding) the threshold voltage of the drive transistor 114.

Figure 4A:
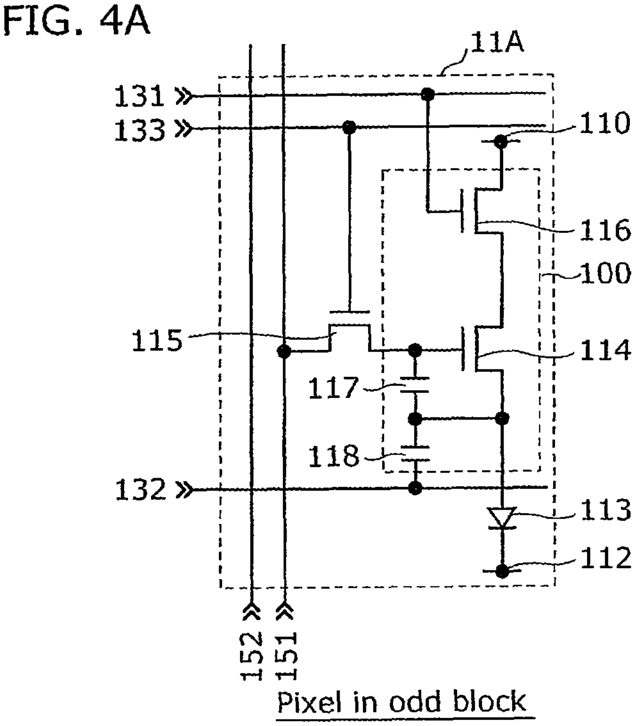
FIG. 4A is a specific circuit configuration diagram of a luminescence pixel of an odd drive block in the image display device according to the first embodiment of the present invention.
Figure 4B:
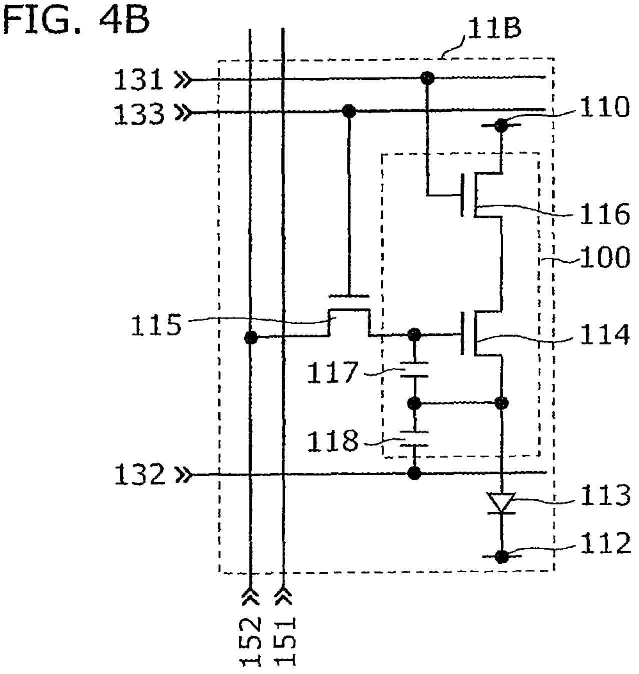
FIG. 4B is a specific circuit configuration diagram of a luminescence pixel of an even drive block in the image display device according to the first embodiment of the present invention.

FIG. 4A is a specific circuit configuration diagram of a luminescence pixel of an odd drive block in the image display device according to the first embodiment of the present invention, and FIG. 4B is a specific circuit configuration diagram of a luminescence pixel of an even drive block in the image display device according to the first embodiment of the present invention. Compared with the current control unit 100 shown in FIG. 3A and FIG. 3B, the current control unit 100 shown in FIG. 4A and FIG. 4B is different in that electrostatic holding capacitors 117 and 118 are implemented as constituent elements of the current control unit 100. Hereinafter, description of points that overlap with the configuration of the image display device shown in FIG. 3A and FIG. 3B shall be omitted.

In FIG. 4A and FIG. 4B, the organic EL element 113 is for example a luminescence element having a cathode connected to the power source line 112, which is a negative power source line, and an anode connected to the source of the drive transistor 114. The organic EL element 113 produces luminescence according to the flow of the drive current of the drive transistor 114.

The drive transistor 114 is a drive transistor having a drain connected to one of the source and the drain of the switching transistor 116, and a source connected to the anode of the organic EL element 113. The drive transistor 114 converts a signal voltage applied between the gate and source to a corresponding drain current. Subsequently, the drive transistor 114 supplies this drain current, as a drive current, to the organic EL element 113.

The switching transistor 115 has a gate connected to the scanning line 133, and one of a source and a drain connected to the gate of the drive transistor 114.

The electrostatic holding capacitor 117 is a first capacitor having one of terminals connected to the gate of the drive transistor 114 and the other of the terminals connected to the source of the drive transistor 114. The electrostatic holding capacitor 117 has a function of holding a charge corresponding to the signal voltage supplied from the first signal line 151 or the second signal line 152, and controlling a signal current supplied from the drive transistor 114 to the organic EL element 113 after the switching transistor 115 is turned OFF for example.

The electrostatic holding capacitor 118 is a second capacitor connected between the other of the terminals of the electrostatic holding capacitor 117 and the first control line 132. The electrostatic holding capacitor 118 first holds the source potential of the drive transistor 114 in the steady state. The information of such source potential remains in a node between the electrostatic holding capacitor 117 and the electrostatic holding capacitor 118 even when a luminance signal voltage is applied from the switching transistor 115. It should be noted that the source potential at this timing is the threshold voltage of the drive transistor 114. Subsequently, even when the timing from the holding of the aforementioned signal voltage to the production of luminescence is different for each of the luminescence pixel rows, the potential of the other of the terminals of the electrostatic holding capacitor 117 is fixed, and thus the gate voltage of the drive transistor 114 is fixed. Meanwhile, since the source potential of the drive transistor 114 is already steady, the electrostatic holding capacitor 118 consequently has a function of holding the source potential of the drive transistor 114.

The second control line 131 is connected to the scanning/control line drive circuit 14, and is connected to the respective luminescence pixels belonging to the pixel row including the pixel elements 11A or 11B. With this, the second control line 131 has a function of supplying the timing for turning the drain current of the drive transistor 114 ON and OFF.

The first control line 132 is connected to the scanning/control line drive circuit 14, and is connected to the respective luminescence pixels belonging to a pixel row including the pixel elements 11A or 11B. With this, the first control line 132 has a function of adjusting the environment for detecting the threshold voltage of the drive transistor 114, by switching voltage levels.

The scanning line 133 has a function of supplying the respective luminescence pixels belonging to the pixel row including the pixel elements 11A or 11B with the timing for writing a signal voltage which is the luminance signal voltage or the reference voltage.

Each of the first signal line 151 and the second signal line 152 is connected to the signal line drive circuit 15 and the respective luminescence pixels belonging to the pixel column including the pixel elements 11A or 11B, and has a function of supplying: the reference voltage for detecting the threshold voltage of the drive TFT; and the signal voltage which determines luminance intensity.

It should be noted that, although not shown in FIG. 2A to FIG. 4B, each of the power source line 110 and the power source line 112 is also connected to other luminescence pixels, and to a voltage source.

Next, the inter-luminescence pixel connection relationship of the second control line 131, the first control line 132, the scanning line 133, the first signal line 151, and the second signal line 152 shall be described.

Figure 5:
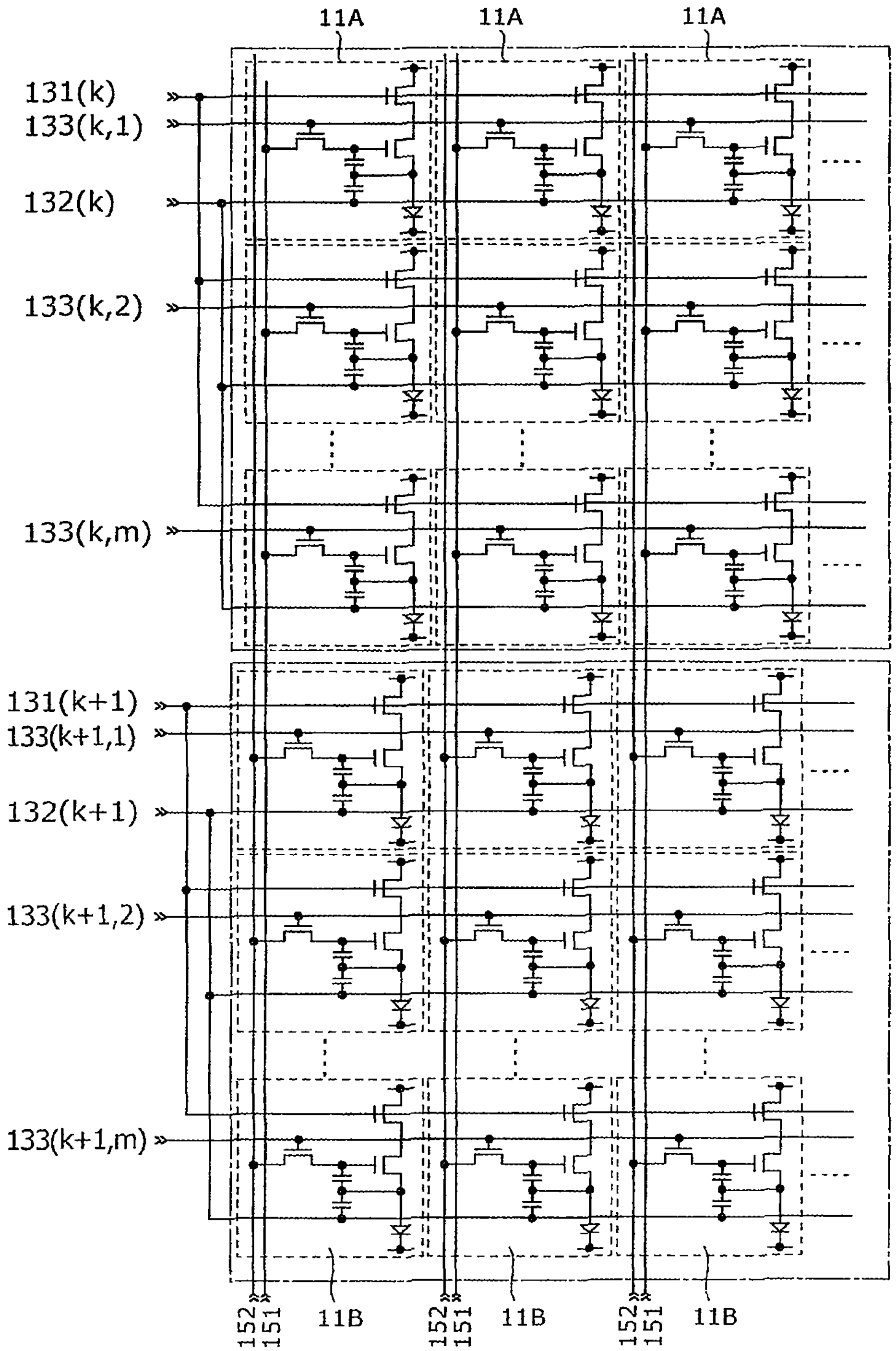
FIG. 5 is a circuit configuration diagram showing part of a display panel included in the image display device according to a first embodiment of the present invention.

FIG. 5 is a circuit configuration diagram showing part of a display panel included in the image display device according to a first embodiment of the present invention. The figure shows two adjacent drive blocks and respective control lines, respective scanning lines, and respective signal lines. In the figure and the subsequent description, the respective control lines, respective scanning lines, and respective signal lines shall be represented by "reference sign (block number; row number in the block)" or "reference sign (block number)".

As previously described, a drive block includes plural luminescence pixel rows, and there are two or more drive blocks within the display panel 10. For example, each of the drive blocks shown in FIG. 5 includes m rows of luminescence pixel rows.

In the kth drive block shown at the top stage of FIG. 5, the second control line 131(*k*) is connected in common to the gates of the respective switching transistors 116 included in all the luminescence pixels 11A in the drive block. Furthermore, the first control line 132(*k*) is connected in common to the respective electrostatic holding capacitors 118 included in all the luminescence pixels 11A in the drive block. Meanwhile, each of the scanning lines 133(*k*, 1) to 133 (*k, m*) are separately connected on a per luminescence pixel row basis. Furthermore, the same connections as those in the kth drive block are also adopted for the (k+1)th drive block shown in the bottom stage of FIG. 5. However, the second control line 131(*k*) connected to the kth drive block and the second control line 131 (*k*+1) connected to the (k+1)th drive block are different control lines, and separate control signals are outputted from the scanning/control line drive circuit 14. Furthermore, the first control line 132(*k*) connected to the kth drive block and the first control line 132 (*k*+1) connected to the (k+1)th drive block are different control lines, and separate control signals are outputted from the scanning/control line drive circuit 14.

Furthermore, in the kth drive block, the first signal line 151 is connected to the other of the source and drain of the respective switching transistors 115 included in all of the luminescence pixels 11A in the drive block. Meanwhile, in the (k+1)th drive block, the second signal line 152 is connected to the other of the source and drain of the respective switching transistors 115 included in all of the luminescence pixels 11B in the drive block.

With the above-described formation of drive blocks, the number of second control lines 131 for controlling the turning ON and OFF of the voltage application to the respective drive transistors 114 is reduced. Furthermore, the number of first control lines 132 for controlling respective Vth detection circuits which detect the threshold voltage Vth of the drive transistor 114 is reduced. Therefore, the number of outputs of the scanning/control line drive circuit 14 which outputs drive signals to these control lines is reduced, thus allowing a reduction in circuit size.

Figure 6A:
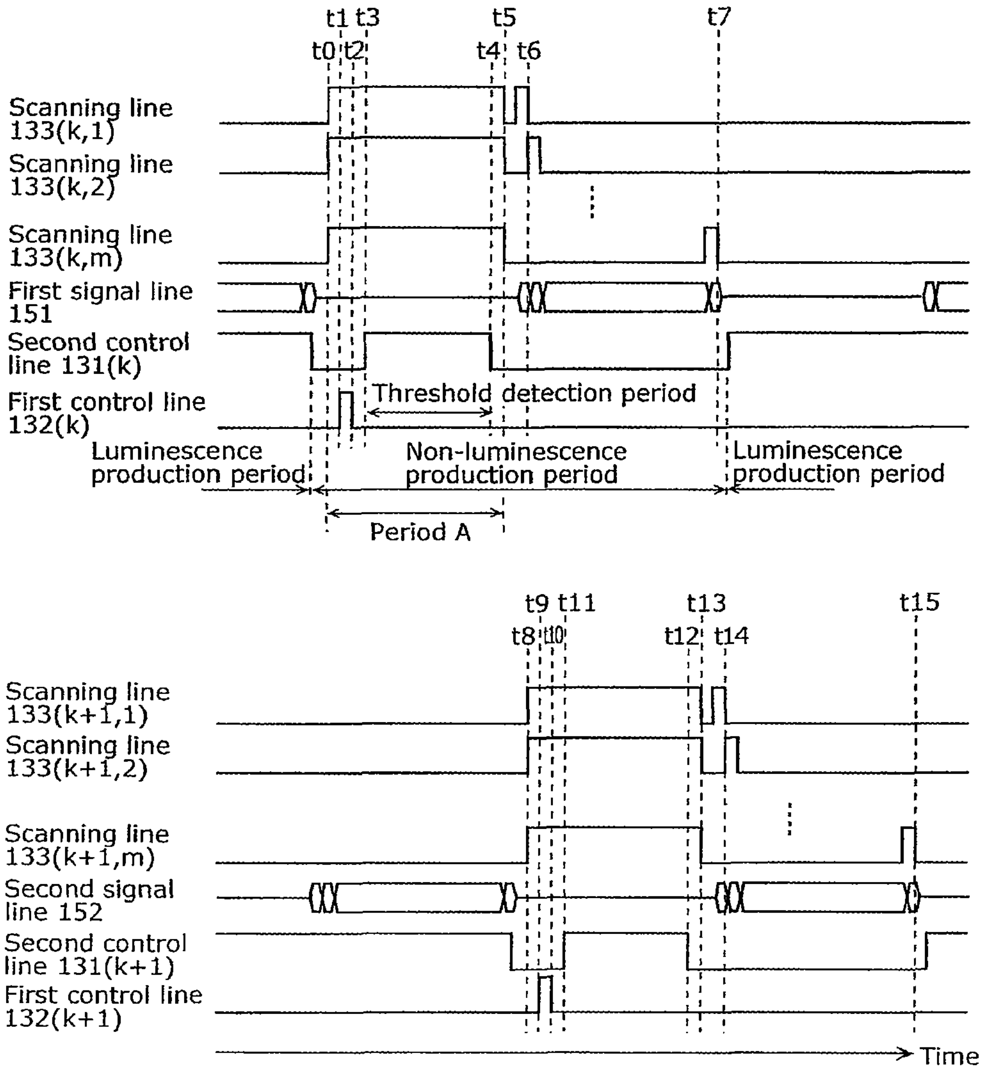
FIG. 6A is an operation timing chart for a driving method of an image display device according to the first embodiment of the present invention.

Next, the driving method of the image display device 1 according to the present embodiment shall be described using FIG. 6A. It should be noted that, here, the driving method of the image display device including the specific circuit configuration shown in FIG. 4A and FIG. 4B shall be described in detail.

Figure 7:
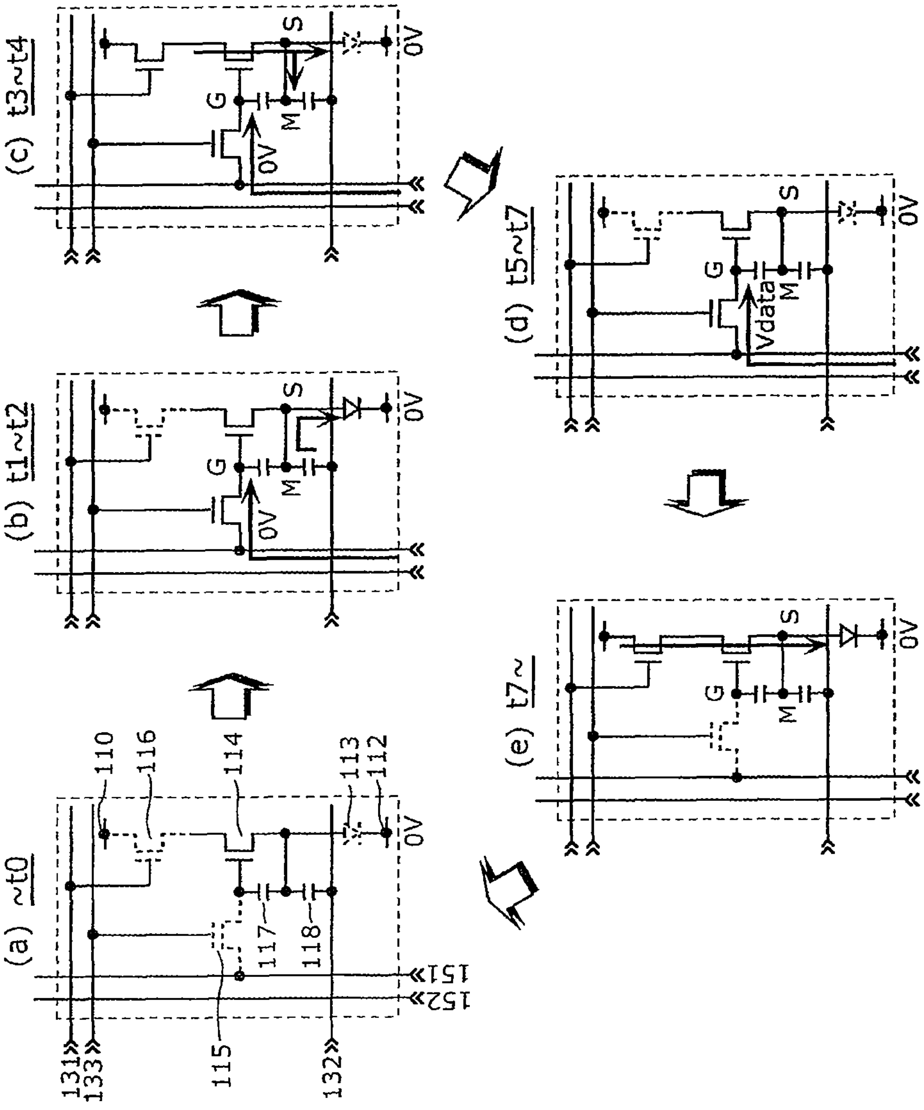
FIGS. 7(*a*), 7(*b*), 7(*c*), 7(*d*), and 7(*e*) are state transition diagrams for a luminescence pixel included in the image display device according to the first embodiment of the present invention.

FIG. 6A is an operation timing chart for the driving method of the image display device according to the first embodiment of the present invention. In the figure, the horizontal axis denotes time. Furthermore, in the vertical direction, the waveform diagrams of the voltage generated in the scanning lines 133(*k*, 1), 133(*k*, 2), and 133(*k, m*), the first signal line 151, the second control line 131(*k*), and the first control line 132(*k*) of the kth drive block are shown in sequence from the top. Furthermore, continuing therefrom, the waveform diagrams of the voltage generated in the scanning lines 133(*k*+1, 1), 133(*k*+1, 2), and 133(*k*+1*, m*), the second signal line 152, the second control line 131(*k*+1), and the first control line 132(*k*+1) of the (k+1)th drive block are shown. Furthermore, FIG. 7 is a state transition diagram for a luminescence pixel included in the image display device according to the first embodiment of the present invention. Furthermore, FIG. 8 is an operation flowchart for the image display device according to the first embodiment of the present invention.

First, immediately before a time t0, all the voltage levels of the scanning lines 133(*k,* 1) to 133(*k, m*) are LOW, and the voltage levels of the first control line 132(*k*) and the second control line 131(*k*) are also LOW. As shown in (a) in FIG. 7, from the moment that the voltage level of the second control line 131(*k*) is LOW, the switching transistor 116 turns ON. With this, the organic EL element 113 stops producing luminescence, and the concurrent production of luminescence of the luminescence pixels in the kth block ends. At the same time, the non-luminescence production period of the kth block begins.

Next, at the time t0, the scanning/control line drive circuit 14 causes the voltage levels of the scanning lines 133(*k*, 1) to 133(*k, m*) to simultaneously change from LOW to HIGH so as to turn ON the switching transistor 115. Furthermore, at this time, the voltage level of the second control line 131(*k*) is already at LOW and the switching transistor 116 is already OFF (S11 in FIG. 8), and the signal line drive circuit 15 causes the signal voltage of the first signal line 151 to change from the luminance signal voltage to the reference voltage with which the drive transistor 114 turns OFF (S12 in FIG. 8). With this, the reference signal voltage is applied to the gate of the drive transistor 114.

Figure 8:
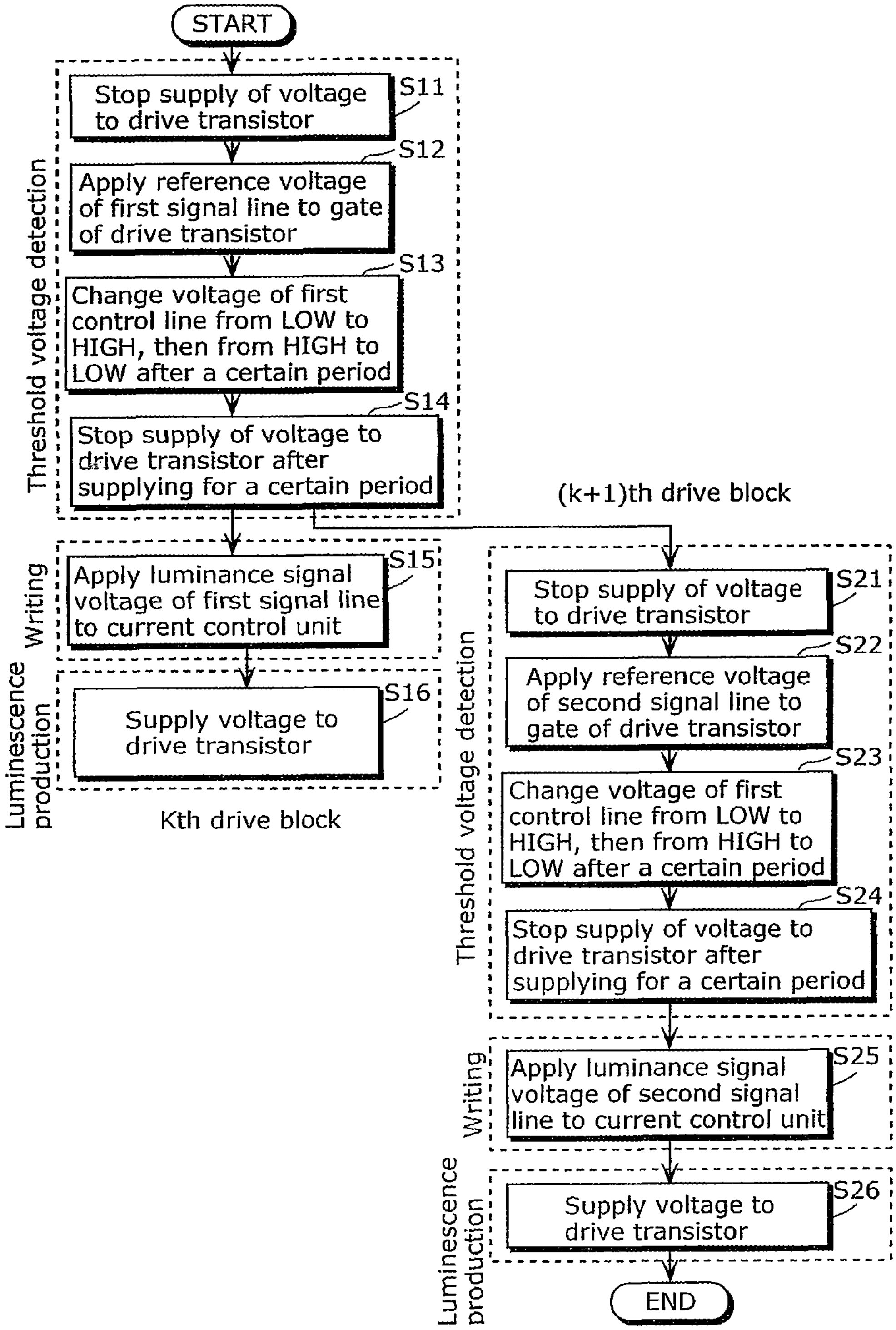
FIG. 8 is an operation flowchart for the image display device according to the first embodiment of the present invention.

Next, at a time t1, the scanning/control line drive circuit 14 causes the voltage level of the first control line 132(*k*) to change from LOW to HIGH, then causes the voltage level to change to LOW at a time t2 after a certain period of time has passed (S13 in FIG. 8). Furthermore, at this time, since the voltage level of the second control line 131(*k*) is maintained at LOW, the potential difference between the source electrode S(M) of the drive transistor 114 and the cathode electrode of the organic EL element 113 becomes asymptotic to the threshold voltage of the organic EL element 113. Here, for example, it is assumed that the potential of the reference signal voltage and the power source line 112 is 0 V, the potential difference (VgH−VgL) between the HIGH voltage level and the LOW voltage level of the first control line 132(*k*) is ΔVreset, the electrostatic capacitance of the electrostatic holding capacitor 118 is C2, and the electrostatic capacitance and threshold voltage of the organic EL element 113 are $C_{EL}$ and $V_T$(EL), respectively. At this time, at the moment when the scanning/control line drive circuit 14 changes the scanning voltage level of the first control line 132(*k*) from LOW to HIGH, the potential Vs of the source electrode S(M) of the drive transistor 114 is approximately equal to the sum of $V_T$(EL) and the voltage distributed between C2 and $C_{EL}$, and is obtained as below.

[Math 1]

$$V_S \approx \frac{C_2}{C_2 + C_{EL}} \Delta V_{reset} + V_{T(EL)} \quad \text{(Expression 1)}$$

Subsequently, as shown in (b) in FIG. 7, due to the self-discharging of the organic EL element 113, the aforementioned Vs becomes asymptotic to $V_T$(EL), in the steady state. In other words, Vs→$V_T$(EL).

Subsequently, at the time t2, the scanning/control line drive circuit 14 causes the voltage level of the first control line 132(*k*) to change from HIGH to LOW, thereby Vs is biased, and is obtained as below.

[Math 2]

$$V_S = V_{T(EL)} - \frac{C_2}{C_1 + C_2 + C_{EL}} \Delta V_{reset} < -V_{th} \quad \text{(Expression 2)}$$

Through the changing of the voltage level of the first control line 132(*k*) from HIGH to LOW, ΔVreset is set to Vgs which is the gate-source voltage of the drive transistor 114 so that a voltage higher than the threshold voltage Vth of the drive transistor 114 is generated therein. Specifically, the potential difference generated in the electrostatic holding capacitor 117 is set to be a potential difference which allows for the detection of threshold voltage of the drive transistor 114, thereby completing the preparation for the threshold voltage detection process.

Next, at a time t3, the scanning/control line drive circuit 14 causes the voltage level of the second control line 131(*k*) to change from LOW to HIGH so as to turn ON the switching transistor 116. With this, as shown in (c) in FIG. 7, the drive transistor 114 turns ON and supplies the drain current to the electrostatic holding capacitors 117 and 118, and to the organic EL element 113 which is OFF. At this time, Vs defined in Expression 2 becomes asymptotic to −Vth. With this, the gate-source voltage of the drive transistor 114 is recorded in the electrostatic holding capacitors 117 and 118 and the organic EL element 113. It should be noted that since, at this time, the anode electrode potential of the organic EL element 113, that is, the source electrode potential of the drive transistor 114 is a potential lower than −Vth(<0), and the cathode electrode potential of the organic EL element 113 is 0 V, the organic EL element 113 becomes inversely-biased, and thus the organic EL element 113 does not produce luminescence and functions as an electrostatic capacitor $C_{EL}$.

In the period from the time t3 to a time t4, the circuit of the luminescence pixel 11A becomes steady, and a voltage equivalent to the threshold voltage Vth of the drive transistor 114 is held in the electrostatic holding capacitors 117 and 118. It should be noted that, since the flowing current for causing the voltage equivalent to the threshold voltage Vth to be held in the electrostatic holding capacitors 117 and 118 is minute, reaching the steady state takes time. Therefore, the longer this period is, the more stable the voltage held in the electrostatic holding capacitor 117 becomes, and by ensuring that this period is sufficiently long, voltage compensation having high-precision is realized.

Next, at the time t4, the scanning/control line drive circuit 14 causes the voltage level of the second control line 131(*k*) to change from HIGH to LOW (S14 in FIG. 8). With this, the current supply to the drive transistor 114 is stopped. At this time, the voltage equivalent to the threshold voltage Vth of the drive transistor 114 is simultaneously held in the respective electrostatic holding capacitors 117 and 118 included in all of the luminescence pixels 11A of the kth drive block.

Next, at a time t5, the scanning/control line drive circuit 14 causes the voltage levels of the scanning lines 133(*k,* 1) to 133(*k, m*) to simultaneously change from HIGH to LOW so as to turn OFF the switching transistor 115.

As described thus far, in the period from the time t0 to the time t5, the correction of the threshold voltage Vth of the drive transistor 114 is executed simultaneously in the kth drive block.

Next, in a period from the time t5 to a time t7, the scanning/control line drive circuit 14 causes the voltage levels of the scanning lines 133(*k,* 1) to 133(*k, m*) to sequentially change from LOW to HIGH to LOW so as to sequentially turn ON the switching transistors 115 on a per luminescence pixel row basis. Furthermore, at this time, the signal line drive circuit 15 causes the signal voltage of the first signal line 151 to change from the reference voltage to the luminance signal voltage Vdata (S15 in FIG. 8). With this, as shown in (d) in FIG. 7, the luminance signal voltage Vdata is applied to the gate of the drive transistor 114. At this time, the potential $V_M$(=Vs) in the connection point M between the electrostatic holding capacitors 117 and 118 becomes the sum of the voltage resulting from the distribution of the signal voltage change amount ΔVdata between C1 and C2, and −Vth which is the Vs potential at the time t4, and is obtained as below.

[Math 3]

$$V_M = \frac{C_1}{C_1 + C_2 + C_{EL}} \Delta V_{data} - V_{th} = \frac{C_1}{C_1 + C_2 + C_{EL}} V_{data} - V_{th} \quad \text{(Expression 3)}$$

In other words, the potential difference Vgs held in the electrostatic holding capacitor 117 is the difference between Vdata and the potential defined in aforementioned Expression 3.

[Math 4]

$$V_{gs} = \frac{C_2 + C_{EL}}{C_1 + C_2 + C_{EL}} V_{data} + V_{th} \quad \text{(Expression 4)}$$

In other words, a summed voltage obtained by adding a voltage corresponding to this luminance signal voltage Vdata and the voltage equivalent to the previously held threshold voltage Vth of the drive transistor 114 is written into the electrostatic holding capacitor 117.

As described thus far, in a period from the time t5 to the time t7, the writing of the corrected luminance signal voltage is sequentially executed in the kth drive block on a per luminescence pixel row basis.

Next, at a time t7 onward, the voltage level of the second control line 131(*k*) is caused to change from LOW to HIGH (S16 in FIG. 8). With this, a drive current corresponding to the aforementioned summed voltage flows to the organic EL element. In other words, production of luminescence begins simultaneously in all the luminescence pixels 11A in the kth drive block.

As described thus far, in a period from the time t7 onward, the production of luminescence by the organic EL elements 113 is executed simultaneously in the kth drive block. Here, a drain current $i_d$ flowing in the drive transistor 114 is expressed below by using a voltage value obtained by deducting the threshold voltage Vth of the drive transistor 114 from the Vgs defined in Expression 4.

[Math 5]

$$i_d = \frac{\beta}{2}\left(\frac{C_2 + C_{EL}}{C_1 + C_2 + C_{EL}} V_{data}\right) \quad \text{(Expression 5)}$$

Here, β is a characteristic parameter regarding mobility. It can be seen from Expression 5 that the drain current $i_d$ for causing the organic EL element 113 to produce luminescence is a current that is not dependent on the threshold voltage Vth of the drive transistor 114.

As described thus far, by forming the luminescence pixel rows into drive blocks, the correction of the threshold voltage Vth of the drive transistors 114 is executed simultaneously in the respective drive blocks. Furthermore, the production of luminescence by the organic EL elements 113 is executed simultaneously in the respective drive blocks. With this, the control for turning the drive current of the drive transistors 114 ON and OFF can be synchronized in the respective drive blocks, and the control of the current path from the source of such drive current onward can be synchronized in the respective drive blocks. Therefore, the first control line 132 and the second control line 131 can be shared in each of the drive blocks.

Furthermore, although the scanning lines 133(*k*, 1) to 133 (*k, m*) are separately connected to the scanning/control line drive circuit 14, the timing of the drive pulse in the threshold voltage compensation period is the same. Therefore, the scanning/control line drive circuit 14 can suppress the rising of the frequency of the pulse signals to be outputted, and thus the output load on the drive circuit is decreased.

Figure 19:
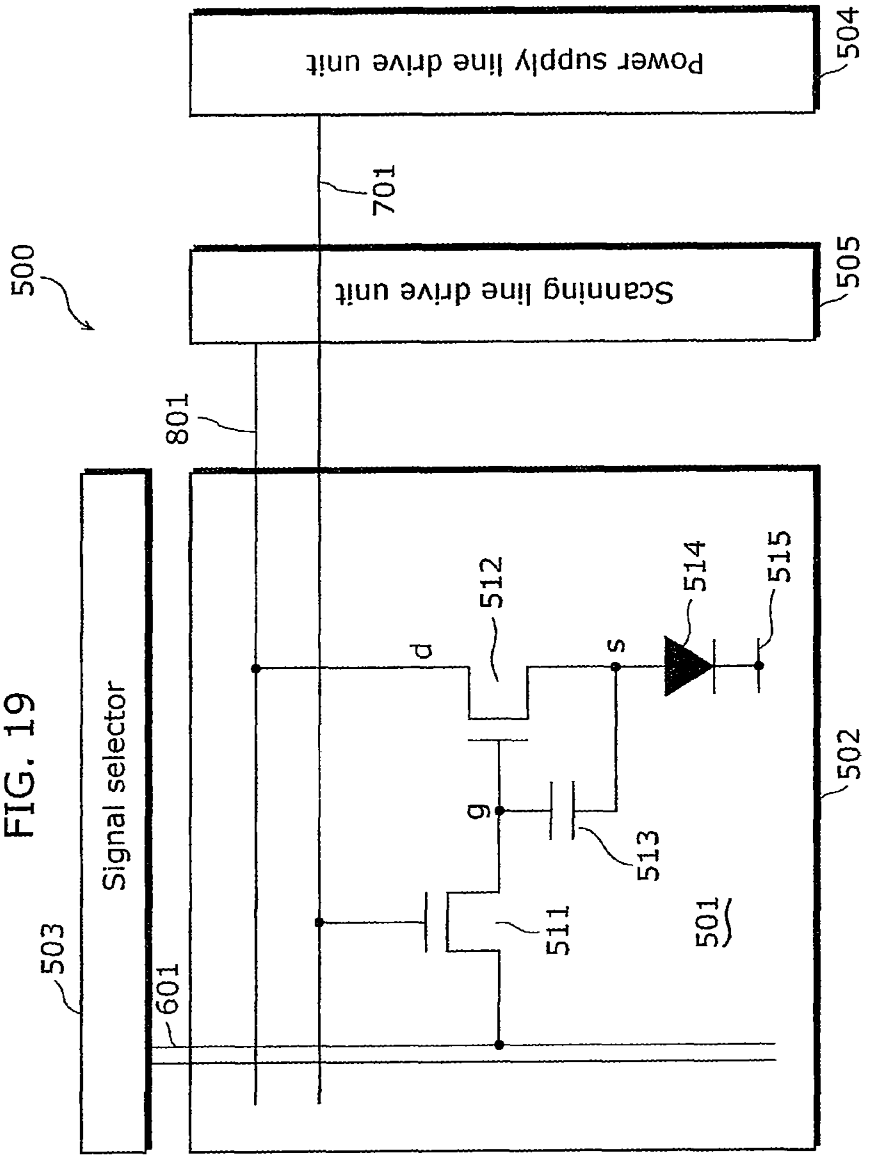
FIG. 19 is a circuit configuration diagram for a luminescence pixel included in the conventional image display device disclosed in Patent Reference 1.
Figure 20:
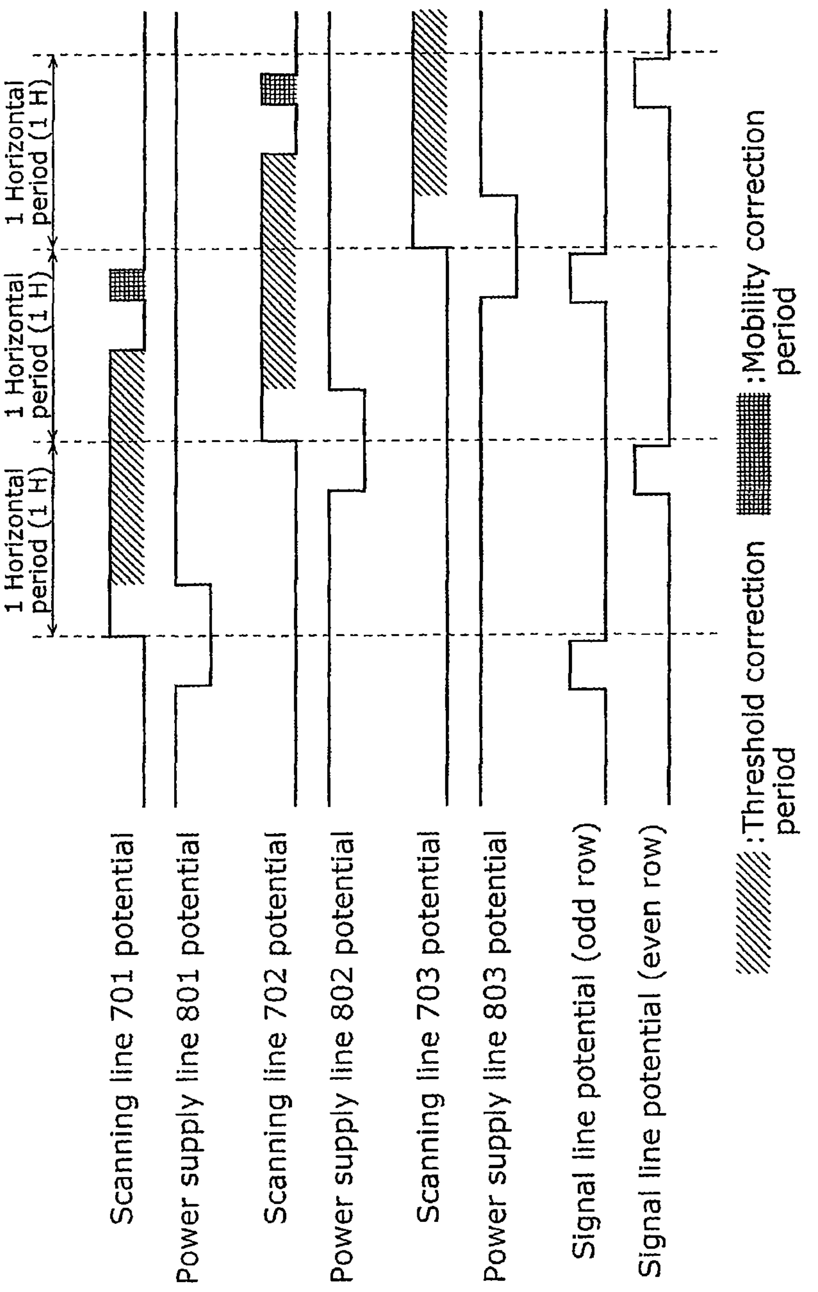
FIG. 20 is an operation timing chart for the image display device disclosed in Patent Reference 1.

The above-described driving method having little output load on the drive circuit is difficult to realize with the conventional image display device 500 disclosed in Patent Reference 1. Even in the pixel circuit diagram shown in FIG. 19, although the threshold voltage Vth the drive transistor 512 is compensated, the source potential of the drive transistor 512 fluctuates and is not fixed after a voltage equivalent to such threshold voltage is held in the holding capacitor 513. As such, in the image display device 500, after the threshold voltage Vth is held, the writing of a summed voltage obtained by adding the luminance signal voltage to the threshold voltage Vth must next be performed immediately. Furthermore, since the aforementioned summed voltage is influenced by the fluctuation of the source potential, the luminescence production operation must subsequently be executed immediately. Specifically, in the conventional image display device 500, the above-described threshold voltage compensation, luminance signal voltage writing, and luminescence production must be executed on a per luminescence pixel row basis, and the forming of drive blocks is not possible with the luminescence pixel 501 shown in FIG. 19

In contrast, in each of the luminescence pixels 11A and 11B included in the image display device 1 according to the present invention, the switching transistor 116 is inserted in the node of the drain of the drive transistor 114 as previously described. With this, the potential in the gate and source of the drive transistor 114 is stabilized, and thus the time from the writing of voltage due to threshold voltage correction up to the additional writing of the luminance signal voltage, or the time from the additional writing up to the luminescence production can be arbitrarily set on a per luminescence pixel row basis. According to this circuit configuration, it is possible to form drive blocks, and the threshold voltage correction periods as well as the luminescence production periods can be made uniform within the same drive block.

Here, the comparison of luminescence duty defined according to the threshold voltage detection period is performed in the conventional image display device using the two signal lines, and the image display device having the drive blocks according to the present invention.

Figure 9:
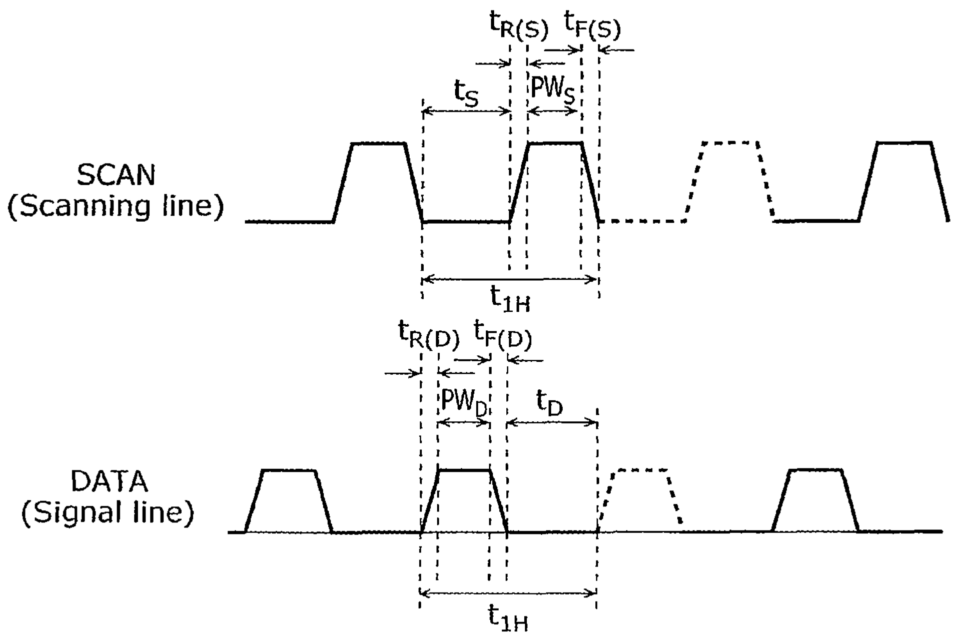
FIG. 9 is a diagram for describing the waveform characteristics of a scanning line and a signal line.

FIG. 9 is a diagram for describing the waveform characteristics of a scanning line and a signal line. In the figure, the period for detecting the threshold voltage Vth in one horizontal period $t_{1H}$ for each pixel row is equivalent to $PW_S$ which is the period in which the scanning line is ON. Furthermore, for a signal line, one horizontal period $t_{1H}$ includes $PW_D$, which is a period in which signal voltage is supplied, and $t_D$ which is a period in which the reference voltage is supplied. Furthermore, assuming the rise time and fall time of $PW_S$ to be $t_{R(S)}$ and $t_{F(S)}$, respectively, and the rise time and fall time of $PW_D$ to be $t_{R(D)}$ and $t_{F(D)}$, respectively, one horizontal period $t_{1H}$ is expressed as below.

[Math 6]

$$t_{1H}=t_D+PW_D+t_{R(D)}+t_{F(D)} \quad \text{(Expression 6)}$$

In addition, assuming $PW_D=t_D$, the subsequent equation is obtained.

[Math 7]

$$t_D+PW_D+t_{R(D)}+t_{F(D)}=2t_D+t_{R(D)}+t_{F(D)} \quad \text{(Expression 7)}$$

According to Expression 6 and Expression 7, $t_D$ is expressed as below.

[Math 8]

$$t_D=(t_{1H}-t_{R(D)}-t_{F(D)})/2 \quad \text{(Expression 8)}$$

Furthermore, since the Vth detection period must begin and end within the reference voltage generation period, $t_D$ is expressed as below when a maximum Vth detection period is secured.

[Math 9]

$$t_D=PW_S+t_{R(S)}+t_{F(S)} \quad \text{(Expression 9)}$$

According to Expression 8 and Expression 9, the subsequent equation is obtained.

[Math 10]

$$PW_S=(t_{1H}-t_{R(D)}-t_{F(D)}-2t_{R(S)}-2t_{F(S)})/2 \quad \text{(Expression 10)}$$

With respect to Expression 10, for example, the luminescence duty of a panel having a vertical resolution of 1,080 scanning lines (+30 lines for blanking) and which is driven at 120 Hz.

In the conventional image display device, one horizontal period $t_{1H}$ in the case of having two signal lines is twice that of the case of having one signal line, and is thus expressed through the subsequent equation.

$$t_{1H}=\{1 \text{ sec.}/(120 \text{ Hz}\times 1110 \text{ lines})\}\times 2=7.5\ \mu S\times 2=15\ \mu S$$

Here, $t_{R(D)}=t_{F(D)}=2$ μS and $t_{R(S)}=t_{F(S)}=1.5$ μS are assumed, and when these are substituted into Expression 10, the Vth detection period $PW_S$ becomes 2.5 μS.

Here, assuming that 1000 μS is required for a Vth detection period to have sufficient precision, at least 1000 μS/2.5 μS=400 of horizontal period is needed as a non-luminescence production period in the horizontal period required for such Vth detection. Therefore, the luminescence duty of the conventional image display device using two signal lines becomes (1110 horizontal period−400 horizontal period)/1110 horizontal period=64% or less.

Next, the luminescence duty of the image display device having the drive blocks according to the present invention shall be calculated. Assuming that 1000 μS is required for a Vth detection period to have sufficient precision as in the above described condition, in the case of block driving, a period A (threshold detection preparation period+threshold detection period) shown in FIG. 6A is equivalent to the aforementioned 1000 μS. In this case, the non-luminescence production period for one frame becomes at least 1000 μS×2=2000 μS since the aforementioned period A and writing time are included. Therefore, the luminescence duty of the image display device having the drive blocks according to the present invention is (1 frame time−2000 μS)/1 frame time, and by substituting (1 sec./120 Hz) as the 1 frame time, is 76% or less.

According to the above comparison result, compared to the conventional image display device using two signal lines, combining block driving as in the present invention ensures a longer luminescence duty even when the same threshold detection period is set. Therefore, it is possible to realize an image display device that ensures sufficient luminescence luminance and has long operational life due to reduced output load on drive circuits.

Conversely, it is understood that when the same luminescence duty is set to the conventional image display device using two signal lines and the image display device combining block driving as in the present invention, the image display device according to the present invention ensures a longer threshold detecting time.

The driving method of the image display device 1 according to the present embodiment shall be described once again.

Meanwhile, at a time t8, the correction of the threshold voltage of the drive transistors 114 in the (k+1)th drive block begins.

First, immediately before the time t8, all the voltage levels of the scanning lines 133(*k*+1, 1) to 133(*k*+1, *m*) are LOW, and the voltage levels of the first control line 132(*k*+1) and the second control line 131(*k*+1) are also LOW. From the moment that the voltage level of the second control line 131(*k*+1) is LOW, the switching transistor 116 turns ON. With this, the organic EL element 113 stops producing luminescence, and the concurrent production of luminescence of the luminescence pixels in the (k+1)th block ends. At the same time, the non-luminescence production period of the (k+1)th block begins.

First, at the time t8, the scanning/control line drive circuit 14 causes the voltage levels of the scanning lines 133(*k*+1, 1) to 133(*k*+1, *m*) to simultaneously change from LOW to HIGH so as to turn ON the switching transistor 115. Furthermore, at this time, the voltage level of the second control line 131(*k*+1) is already at LOW and the switching transistor 116 is already OFF (S21 in FIG. 8), and the signal line drive circuit 15 causes the signal voltage of the second signal line 152 to change from the luminance signal voltage to the reference voltage (S22 in FIG. 8). With this, the reference signal voltage is applied to the gate of the drive transistor 114.

Next, at a time t9, the scanning/control line drive circuit 14 causes the voltage level of the first control line 132(*k*+1) to change from LOW to HIGH, then causes the voltage level to change to LOW at a time t10 after a certain period of time has passed (S23 in FIG. 8). Furthermore, at this time, since the voltage level of the second control line 131(*k*+1) is maintained at LOW, the potential difference between the source electrode S(M) of the drive transistor 114 and the cathode electrode of the organic EL element 113 becomes asymptotic to the threshold voltage of the organic EL element 113. With this, the potential difference that is accumulated in the electrostatic holding capacitor 117 of the current control unit 100 is set to the potential difference which allows for the detection of the threshold voltage of the drive transistor, thereby completing the preparation for the threshold voltage detection process.

Next, at a time t11, the scanning/control line drive circuit 14 causes the voltage level of the second control line 131(*k*+1) to change from LOW to HIGH so as to turn ON the switching transistor 116. With this, the driving transistor 114 turns ON and supplies the drain current to the electrostatic holding capacitors 117 and 118, and to the organic EL element 113 which is OFF. At this time, the gate-source voltage of the drive transistor 114 is recorded in the electrostatic holding capacitors 117 and 118 and the organic EL element 113. It should be noted that since, at this time, the anode electrode potential of the organic EL element 113, that is, the source electrode potential of the drive transistor 114 is a potential lower than −Vth(<0), and the cathode electrode potential of the organic EL element 113 is 0 V, the organic EL element 113 becomes inversely-biased, and thus the organic EL element 113 functions as an electrostatic capacitor $C_{EL}$ without producing luminescence.

In a period from the time t11 to a time t12, the circuit of the luminescence pixel 11B becomes steady, and a voltage equivalent to the threshold voltage Vth of the drive transistor 114 is held in the electrostatic holding capacitors 117 and 118. It should be noted that the precision of the detection of the threshold voltage Vth held in the electrostatic holding capacitors 117 and 118 improves as this period becomes longer. Therefore, by ensuring that this time is sufficiently long, highly-precise voltage compensation is realized.

Next, at the time t12, the scanning/control line drive circuit 14 causes the voltage levels of the scanning lines 133(*k*+1, 1) to 133(*k*+1, *m*) to simultaneously change from HIGH to LOW so as to turn OFF the switching transistor 115 (S24 in FIG. 8). With this, the drive transistor 114 turns OFF. At this time, the voltage equivalent to the threshold voltage Vth of the drive transistor 114 is simultaneously held in the respective electrostatic holding capacitors 117 included in all of the luminescence pixels 11B of the (k+1)th drive block.

Next, at a time t13, the scanning/control line drive circuit 14 causes the voltage level of the second control line 131(*k*+1) to change from HIGH to LOW.

As described thus far, in the period from the time t11 to the time t12, the correction of the threshold voltage Vth of the drive transistor 114 is performed simultaneously in the (k+1)th drive block.

Next, at the time t13 and onward, the scanning/control line drive circuit 14 causes the voltage levels of the scanning lines 133(*k*+1, 1) to 133(*k*+1, *m*) to sequentially change from LOW to HIGH to LOW so as to sequentially turn ON the switching transistors 115 on a per luminescence pixel row basis. Furthermore, at this time, the signal line drive circuit 15 causes the signal voltage of the second signal line 152 to change from the reference voltage to the luminance signal voltage (S25 in FIG. 8). With this, the luminance signal voltage is applied to the gate of the drive transistor 114. At this time, a summed voltage obtained by adding a voltage corresponding to this luminance signal voltage Vdata and the voltage equivalent to the previously held threshold voltage Vth of the drive transistor 114 is written into the electrostatic holding capacitor 117.

As described thus far, in the period from the time t13 onward, the writing of the corrected luminance signal voltage is sequentially executed in the (k+1)th drive block on a per luminescence pixel row basis.

Next, at a time t15 onward, the voltage level of the second control line 131(*k*+1) is caused to change from LOW to HIGH (S26 in FIG. 8). With this, a drive current corresponding to the aforementioned summed voltage flows to the organic EL element. In other words, production of luminescence begins simultaneously in all the luminescence pixels 11B in the (k+1)th drive block.

As described thus far, in the period from the time t15 onward, the production of luminescence in the organic EL elements 113 is executed simultaneously in the (k+1)th drive block.

The operations described thus far are also executed sequentially in the (k+2)th drive block onward in the display panel 10.

Figure 6B:
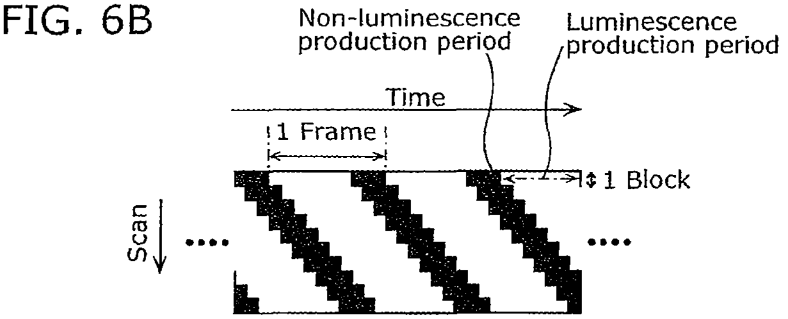
FIG. 6B is a state transition diagram of a drive block which produces luminescence according to the driving method according to the first embodiment of the present invention.

FIG. 6B is a state transition diagram of a drive block which produces luminescence according to the driving method according to the first embodiment of the present invention. In the figure, the luminescence production periods and the non-luminescence production periods of each drive block in a certain luminescence pixel column is shown. Plural drive blocks are shown in the vertical direction, and the horizontal axis shows time. Here, the non-luminescence production period includes the above-described threshold voltage correction period and the luminance signal voltage writing period.

According to the driving method of the image display device according to the first embodiment of the present invention, luminescence production periods are concurrently set in the same drive block. Therefore, among the drive blocks, the luminescence production periods appear in a staircase pattern with respect to the scanning direction.

As described thus far, the drive transistor 114 threshold voltage correction periods as well as the timings thereof can be made uniform within the same drive block through the luminescence pixel circuits in which the switching transistor 116 and the electrostatic holding capacitor 118 are provided, the control lines to the respective luminescence pixels that are formed into drive blocks, the arrangement of the scanning lines and the signal lines, and the above-described driving method. In addition, the luminescence production periods as well as the timings thereof can be made uniform within the same drive block. Therefore, the load on the scanning/control line drive circuit 14 which outputs signals for controlling the conductive state and non-conductive state of respective switches and signals for controlling current paths, and on the signal line drive circuit 15 which controls signal voltages is decreased. In addition, through the above-described forming of drive blocks and the two signal lines arranged for every luminescence pixel column, the drive transistor 114 threshold voltage correction period can take a large part of a 1 frame period Tf which is the time in which all the luminescence pixels are rewritten. This is because the threshold voltage correction period is provided in the (k+1)th drive block in the period in which the luminance signal is sampled in the kth drive block. Therefore, the threshold voltage correction period is not divided on a per luminescence pixel row basis, but is divided on a per drive block basis. Thus, even when the display area is increased, a long relative threshold voltage correction period with respect to one frame period can be set without a significant increase in the number of outputs of the scanning/control line drive circuit 14 and without reducing luminescence duty. With this, a drive current based on luminance signal voltage that has been corrected with a high degree of precision flows to the luminescence elements, and thus image display quality improves.

For example, in the ease where the display panel 10 is divided into N drive blocks, the threshold correction period allocated to each luminescence pixel is at most Tf/N. In contrast, in the case where the threshold voltage correction period is set at a different timing for each of the luminescence pixel rows, and it is assumed that there are M rows of luminescence pixel rows (M>>N), threshold correction period allocated to each luminescence pixel is at most Tf/M. Furthermore, even in the case where two signal lines are disposed for each luminescence pixel column as disclosed in Patent Reference 1, threshold correction period allocated to each luminescence pixel is at most 2 Tf/M.

Furthermore, by forming drive blocks, the second control line for controlling the turning ON and OFF of the voltage application to the drive transistor 114 and the first control line for controlling the current path of the drive current from the source onward can be shared within a drive block. Therefore, the number of control lines outputted from the scanning/control line drive circuit 14 is reduced. Therefore, the load on the drive circuit is decreased.

For example, in the conventional image display device 500 disclosed in Patent Reference 1, two control lines (power supply line and scanning line) are disposed per luminescence pixel row. Assuming that the image display device 500 includes M rows of luminescence pixel rows, the control lines would total 2M lines.

In contrast, in the image display device according to the first embodiment of the present invention, one signal line per luminescence pixel row and two control lines per drive block are outputted from the scanning/control line drive circuit 14. Therefore, assuming that the image display device 1 includes M rows of luminescence pixel rows, the control lines (including scanning lines) would total (M+2N) lines.

Since M>>N is realized in the case of a large surface area and a large number of rows of luminescence pixels, in such case, the number of control lines in the image display device 1 according to the present invention can be reduces to approximately half compared to the number of control lines in the conventional image display device 500.

Second Embodiment

Hereinafter, an embodiment of the present invention shall be described with reference to the Drawings.

Figure 10:
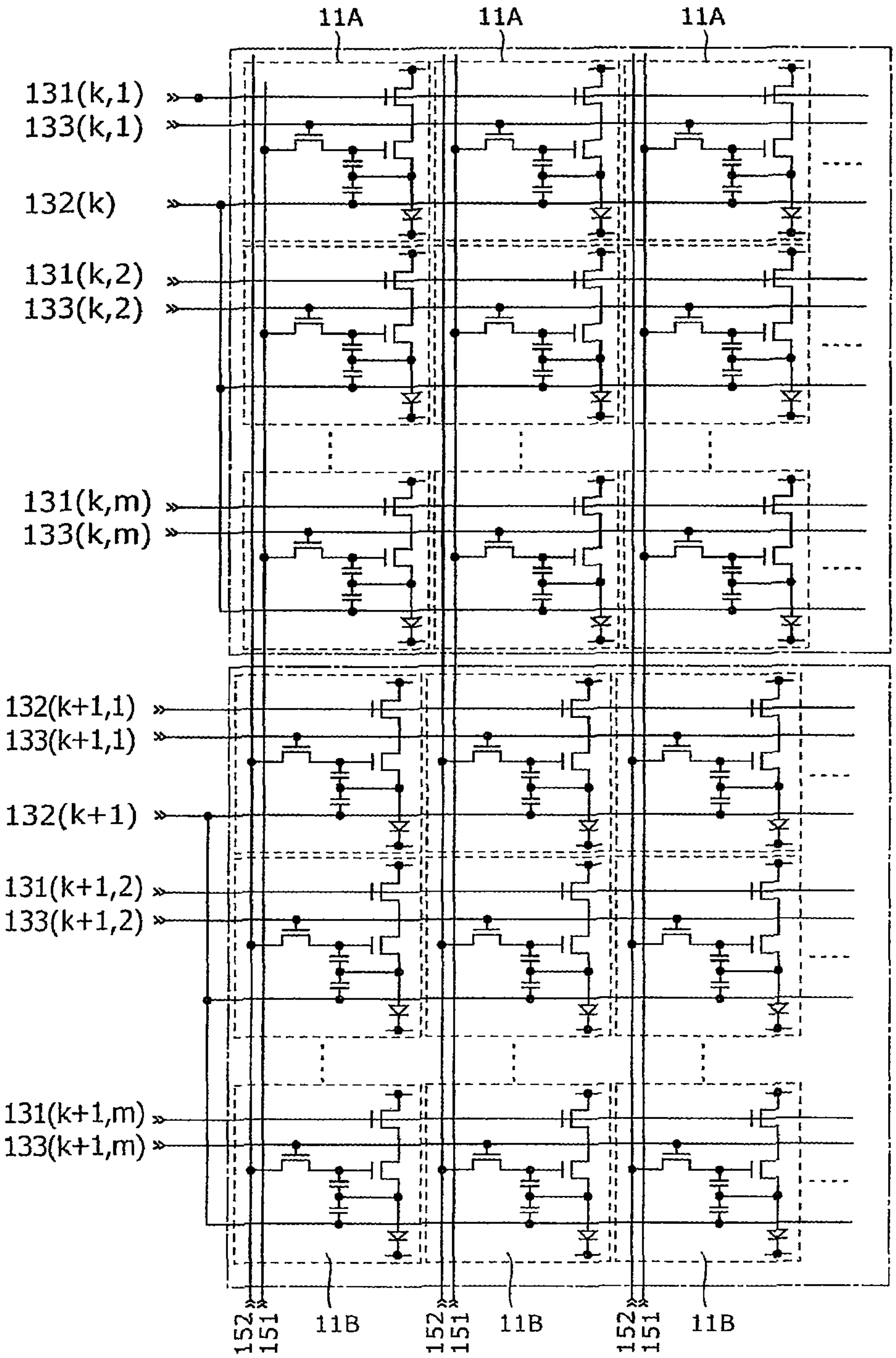
FIG. 10 is a circuit configuration diagram showing part of a display panel included in an image display device according to a second embodiment of the present invention.

FIG. 10 is a circuit configuration diagram showing part of a display panel included in an image display device according to a second embodiment of the present invention. The figure shows two adjacent drive blocks and respective control lines, respective scanning lines, and respective signal lines. In the figure and the subsequent description, the respective control lines, respective scanning lines, and respective signal lines shall be represented by "reference number (block number; row number of the block)" or "reference number (block number)".

Compared to the image display device 1 shown in FIG. 5, the image display device shown in the figure has the same circuit configuration for the respective luminescence pixels but is different in that the second control line 131 is not shared on a drive block basis and is connected on a per luminescence pixel row basis to the scanning/control line drive circuit 14 not shown in the figure. Description of points that are the same as in the image display device according to the first embodiment shown in FIG. 5 shall be omitted, and only the points of difference shall be described hereafter.

In the kth drive block shown at the top stage of FIG. 10, each of the second control lines 131(*k,* 1) to 131(*k, m*) are disposed to a corresponding one of the luminescence pixel rows in the drive block and is separately connected to the gates of the respective switching transistors 116 included in the corresponding luminescence pixels 11A in the drive block. Furthermore, the first control line 132(*k*) is connected in common to the respective electrostatic holding capacitors 118 included in all the luminescence pixels 11A in the drive block. Meanwhile, each of the scanning lines 133(*k,* 1) to 133 (*k, m*) are separately connected on a per luminescence pixel row basis. Furthermore, the same connections as those in the kth drive block are also carried out on the (k+1)th drive block shown in the bottom stage of FIG. 5. However, the first control line 132(*k*) connected to the kth drive block and the first control line 132 (*k*+1) connected to the (k+1)th drive block are different control lines, and separate control signals are outputted from the scanning/control line drive circuit 14.

Furthermore, in the kth drive block, the first signal line 151 is connected to the other of the source and drain of the respective switching transistors 115 included in all of the luminescence pixels 11A in the drive block. Meanwhile, in the (k+1) th drive block, the second signal line 152 is connected to the other of the source and drain of the respective switching transistors 115 included in all of the luminescence pixels 11B in the drive block.

With the above-described formation of drive blocks, the number of first control lines 132 for controlling the respective Vth detection circuits is reduced. Therefore, the load on the scanning/control line drive circuit 14 which outputs drive signals to these control lines is reduced.

Figure 11A:
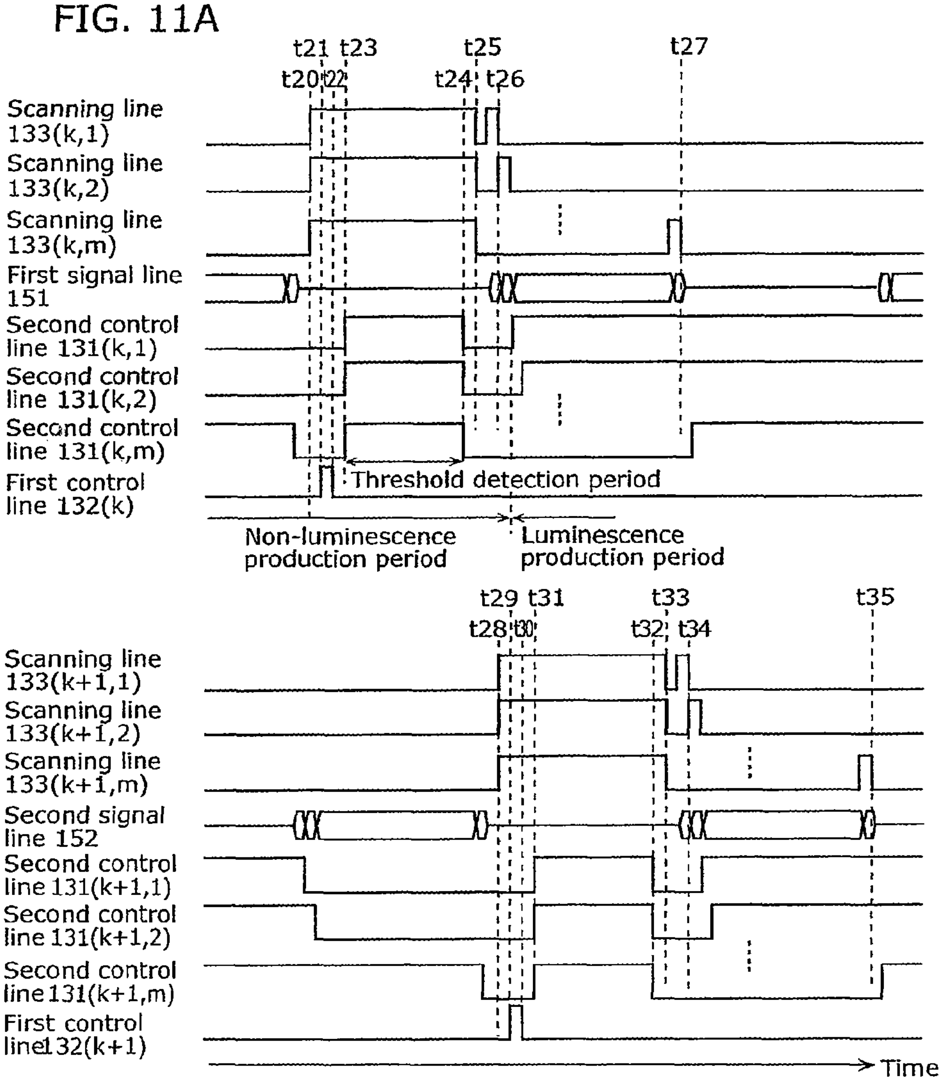
FIG. 11A is an operation timing chart for a driving method of an image display device according to the second embodiment of the present invention.

Next, the driving method of the image display device according to the present embodiment shall be described using FIG. 11A.

FIG. 11A is an operation timing chart for the driving method of the image display device according to the second embodiment of the present invention. In the figure, the horizontal axis denotes time. Furthermore, in the vertical direction, the waveform diagrams of the voltage generated in the scanning lines 133(*k,* 1), 133(*k,* 2), and 133(*k, m*), the first signal line 151, the second control lines 131(*k,* 1), 131(*k,* 2), and 131(*k, m*), and the first control line 132(*k*) of the kth drive block are shown in sequence from the top. Furthermore, continuing therefrom, the waveform diagrams of the voltage generated in the scanning lines 133(*k*+1, 1), 133(*k*+1, 2), and 133(*k*+1*, m*), the second signal line 152, the second control lines 131(*k*+1, 1), 131(*k*+1, 2), and 131(*k*+1, *m*), and the first control line 132(*k*+1) of the (k+1)th drive block are shown.

Compared to the driving method according to the first embodiment shown in FIG. 6A, the driving method according to the present embodiment is different only in that the signal voltage writing periods as well as the luminescence production periods are set on a per luminescence pixel row basis, without the luminescence production periods being made uniform within a drive block.

First, immediately before a time t20, all the voltage levels of the scanning lines 133(*k,* 1) to 133(*k, m*) are all LOW, and the voltage levels of the first control line 132(*k*) and the second control lines 131(*k,* 1) to 131(*k, m*) are also LOW. As shown in (a) in FIG. 7, from the moment that the voltage level of the second control lines 131(*k,* 1) to 131(*k, m*) are LOW, the switching transistor 116 turns ON. With this, the organic EL element 113 stops producing luminescence, and the concurrent production of luminescence in each of the luminescence pixel rows in the kth block ends. At the same time, the non-luminescence production period of the kth block begins.

Next, at the time t20, the scanning/control line drive circuit 14 causes the voltage levels of the scanning lines 133(*k,* 1) to 133(*k, m*) to simultaneously change from LOW to HIGH so as to turn ON the switching transistor 115. Furthermore, at this time, the voltage levels of the second control lines 131(*k,* 1) to 131(*k, m*) are already at LOW and the switching transistor 116 is already OFF (S11 in FIG. 8), and the signal line drive circuit 15 causes the signal voltage of the first signal line 151 to change from the luminance signal voltage to the reference voltage (S12 in FIG. 8). With this, the reference signal voltage is applied to the gate of the drive transistor 114.

Next, at a time t21, the scanning/control line drive circuit 14 causes the voltage level of the first control line 132(*k*) to change from LOW to HIGH, then causes the voltage level to change to LOW at a time t22 after a certain period of time has passed (S13 in FIG. 8). Furthermore, at this time, since the voltage level of the second control lines 131(*k,* 1) to 131(*k, m*) are maintained at LOW, the potential difference between the source electrode S(M) of the drive transistor 114 and the cathode electrode of the organic EL element 113 becomes asymptotic to the threshold voltage of the organic EL element 113. At this time, at the time t22, the potential Vs of the source electrode S(M) of the drive transistor 114 is defined by Expression 2 describe in the first embodiment. With this, the potential difference that is accumulated in the electrostatic holding capacitor 117 of the current control unit 100 is set to the potential difference which allows for detection of the threshold voltage of the drive transistor, thereby completing the preparation for the threshold voltage detection process.

Next, at a time t23, the scanning/control line drive circuit 14 causes the voltage levels of the second control lines 131(*k,* 1) to 131(*k, m*) to concurrently change from LOW to HIGH so as to turn ON the respective switching transistors 116. With this, the driving transistor 114 turns ON and supplies the drain current to the electrostatic holding capacitors 117 and 118, and to the organic EL element 113 which is OFF. At this time, Vs defined in Expression 2 becomes asymptotic to −Vth. With this, the gate-source voltage of the drive transistor 114 is recorded in the electrostatic holding capacitors 117 and 118 and the organic EL element 113. It should be noted that since, at this time, the anode electrode potential of the organic EL element 113, that is, the source electrode potential of the drive transistor 114 is a potential lower than −Vth(<0), and the cathode potential of the organic EL element 113 is 0 V, the organic EL element 113 becomes inversely-biased, and thus the organic EL element 113 functions as an electrostatic capacitor $C_{EL}$ without producing luminescence.

In the period from the time t23 to a time t24, the circuit of the luminescence pixel 11A becomes steady, and a voltage equivalent to the threshold voltage Vth of the drive transistor 114 is held in the electrostatic holding capacitors 117 and 118. It should be noted that, since the flowing current for causing the voltage equivalent to the threshold voltage Vth to be held in the electrostatic holding capacitors 117 and 118 is minute, reaching the steady state takes time. Therefore, the longer this period is, the more stable the voltage held in the electrostatic holding capacitor 117 becomes, and by ensuring that this period is sufficiently long, voltage compensation having high-precision is realized.

Next, at the time t24, the scanning/control line drive circuit 14 causes the voltage levels of the second control lines 131(*k,* 1) to 131(*k, m*) to concurrently change from HIGH to LOW (S14 in FIG. 8). With this, the current supply to the drive transistor 114 is stopped. At this time, the voltage equivalent to the threshold voltage Vth of the drive transistor 114 is simultaneously held in the respective electrostatic holding capacitors 117 and 118 included in all of the luminescence pixels 11A of the kth drive block.

Next, at a time t25, the scanning/control line drive circuit 14 causes the voltage levels of the scanning lines 133(*k*, 1) to 133(*k*, *m*) to simultaneously change from HIGH to LOW so as to turn OFF the switching transistor 115.

As described thus far, in the period from the time t20 to the time t25, the correction of the threshold voltage Vth of the drive transistor 114 is executed simultaneously in the kth drive block.

Next, at the time t25 and onward, the scanning/control line drive circuit 14 causes the voltage levels of the scanning lines 133(*k*, 1) to 133(*k*, *m*) to sequentially change from LOW to HIGH to LOW so as to sequentially turn ON the switching transistors 115 on a per luminescence pixel row basis. Furthermore, at this time, the signal line drive circuit 15 causes the signal voltage of the first signal line 151 to change from the reference voltage to the luminance signal voltage Vdata (S15 in FIG. 8). With this, the luminance signal voltage Vdata is applied to the gate of the drive transistor 114. At this time, the potential difference Vgs held in the electrostatic holding capacitor 117 is the difference between Vdata and the potential defined in Expression 3 described in the first embodiment. In other words, a summed voltage obtained by adding a voltage corresponding to this luminance signal voltage Vdata and the voltage equivalent to the previously held threshold voltage Vth of the drive transistor 114 is written into the electrostatic holding capacitor 117.

Furthermore, after the voltage level of the scanning line 133(*k*, 1) changes from LOW to HIGH to LOW, the scanning/control line drive circuit 14 next causes the voltage level of the second control line 131(*k*, 1) to change from LOW to HIGH. This operation is sequentially repeated on a per luminescence pixel row basis.

As described thus far, in the period from the time t25 onward, the writing of the corrected luminance signal voltage and the production of luminescence are sequentially executed in the (k+1)th drive block on a per luminescence pixel row basis.

As described thus far, in a period from the time t26 onward, the production of luminescence by the organic EL elements 113 is executed in the kth drive block on a per luminescence pixel row basis. Here, the drain current id flowing in the drive transistor 114 is defined by Expression 5, using a voltage value obtained by deducting the threshold voltage Vth of the drive transistor 114 from the Vgs defined in Expression 4 in the first embodiment. It can be seen from Expression 5 that the drain current id for causing the organic EL element 113 to produce luminescence is a current that is not dependent on the threshold voltage Vth of the drive transistor 114.

As described thus far, by forming the luminescence pixel rows into drive blocks, the correction of the threshold voltage Vth of the drive transistors 114 is executed simultaneously in the respective drive blocks. With this, the control of the current path from the source of such drive current onward can be synchronized in the respective drive blocks. Therefore, the first control line 132 can be shared in each of the drive blocks.

Furthermore, although the scanning lines 133(*k*, 1) to 133 (*k*, *m*) are separately connected to the scanning/control line drive circuit 14, the timing of the drive pulse in the threshold voltage compensation period is the same. Therefore, the scanning/control line drive circuit 14 can suppress the rising of the frequency of the pulse signals to be outputted, and thus the output load on the drive circuit is decreased.

From the same perspective as the first embodiment, the present embodiment also has the advantage that luminescence duty can be secured longer compared to the conventional image display device using two signal lines.

Therefore, it is possible to realize an image display device that ensures sufficient luminescence luminance and has long operational life due to reduced output load on drive circuits.

Furthermore, it is understood that when the same luminescence duty is set to the conventional image display device using two signal lines and the image display device combining block driving as in the present invention, the image display device according to the present invention ensures a longer threshold detecting time.

The driving method of the image display device according to the present embodiment shall be described once again.

Meanwhile, at a time t28, the correction of the threshold voltage of the drive transistors 114 in the (k+1)th drive block begins.

First, immediately before the time t28, all the voltage levels of the scanning lines 133(*k*+1, 1) to 133(*k*+1, *m*) are LOW, and the voltage levels of the first control line 132(*k*+1) and the second control lines 131(*k*+1, 1) to 131(*k*+1, *m*) are also LOW. As shown in (a) in FIG. 7, from the moment that the voltage levels of the second control lines 131(*k*+1, 1) to 131(*k*+1, *m*) are LOW, the switching transistor 116 turns OFF. With this, the organic EL element 113 stops producing luminescence, and the production of luminescence in each of the luminescence pixel rows in the (k+1)th block ends. At the same time, the non-luminescence production period of the (k+1)th block begins.

Next, at the time t28, the scanning/control line drive circuit 14 causes the voltage levels of the scanning lines 133(*k*+1, 1) to 133(*k*+1, *m*) to simultaneously change from LOW to HIGH so as to turn ON the switching transistor 115. Furthermore, at this time, the voltage levels of the second control lines 131 (*k*+1, 1) to 131(*k*+1, *m*) are already at LOW and the switching transistor 116 is already OFF (S21 in FIG. 8), and the signal line drive circuit 15 causes the signal voltage of the second signal line 152 to change from the luminance signal voltage to the reference voltage (S22 in FIG. 8). With this, the reference signal voltage is applied to the gate of the drive transistor 114.

Next, at a time t29, the scanning/control line drive circuit 14 causes the voltage level of the first control line 132(*k*+1) to change from LOW to HIGH, then causes the voltage level to change to LOW at a time t30 after a certain period of time has passed (S23 in FIG. 8). With this, the potential difference generated in the electrostatic holding capacitor 117 of the current control unit 100 is set to the potential difference which allows for detection of the threshold voltage of the drive transistor, thereby completing the preparation for the threshold voltage detection process.

Next, at a time t31, the scanning/control line drive circuit 14 causes the voltage levels of the second control lines 131 (*k*+1, 1) to 131(*k*+1, *m*) to concurrently change from LOW to HIGH so as to turn ON the respective switching transistors 116. With this, the driving transistor 114 turns ON and supplies the drain current to the electrostatic holding capacitors 117 and 118. At this time, the gate-source voltage of the drive transistor 114 is held in the electrostatic holding capacitors 117 and 118 and the organic EL element 113.

In the period from the time t31 to a time t32, the circuit of the luminescence pixel 11A becomes steady, and a voltage equivalent to the threshold voltage Vth of the drive transistor 114 is held in the electrostatic holding capacitors 117 and 118. It should be noted that, since the flowing current for causing the voltage equivalent to the threshold voltage Vth to be held in the electrostatic holding capacitors 117 and 118 is minute, reaching the steady state takes time. Therefore, the longer this period is, the more stable the voltage held in the electrostatic holding capacitor 117 becomes, and by ensuring that this period is sufficiently long, voltage compensation having high-precision is realized.

Next, at the time t32, the scanning/control line drive circuit 14 causes the voltage levels of the second control lines 131 (*k*+1, 1) to 131(*k*+1, *m*) to concurrently change from HIGH to LOW (S25 in FIG. 8). With this, the current supply to the drive transistor 114 is stopped. At this time, the voltage equivalent to the threshold voltage Vth of the drive transistor 114 is simultaneously held in the respective electrostatic holding capacitors 117 and 118 included in all of the luminescence pixels 11A of the (k+1)th drive block.

Next, at a time t33, the scanning/control line drive circuit 14 causes the voltage levels of the scanning lines 133(*k*+1, 1) to 133(*k*+1, *m*) to simultaneously change from HIGH to LOW so as to turn OFF the switching transistor 115.

As described thus far, in the period from the time t28 to the time t23, the correction of the threshold voltage Vth of the drive transistor 114 is executed simultaneously in the (k+1)th drive block.

Next, at the time t33 and onward, the scanning/control line drive circuit 14 causes the voltage levels of the scanning lines 133(*k*+1, 1) to 133(*k*+1, *m*) to sequentially change from LOW to HIGH to LOW so as to sequentially turn ON the switching transistors 115 on a per luminescence pixel row basis. Furthermore, at this time, the signal line drive circuit 15 causes the signal voltage of the second signal line 152 to change from the reference voltage to the luminance signal voltage (S25 in FIG. 8). With this, the luminance signal voltage is applied to the gate of the drive transistor 114. At this time, a summed voltage obtained by adding a voltage corresponding to this luminance signal voltage and the voltage equivalent to the previously held threshold voltage Vth of the drive transistor 114 is written into the electrostatic holding capacitor 117.

Furthermore, after the voltage level of the scanning line 133(*k*+1, 1) changes from LOW to HIGH to LOW, the scanning/control line drive circuit 14 next causes the voltage level of the second control line 131(*k*+1, 1) to change from LOW to HIGH. This operation is sequentially repeated on a per luminescence pixel row basis.

As described thus far, at the time t34 and onward, the writing of the corrected luminance signal voltage and the production of luminescence are sequentially executed in the (k+1)th drive block on a per luminescence pixel row basis.

The operations described thus far are also executed sequentially in the (k+2)th drive block onward in the display panel 10.

Figure 11B:
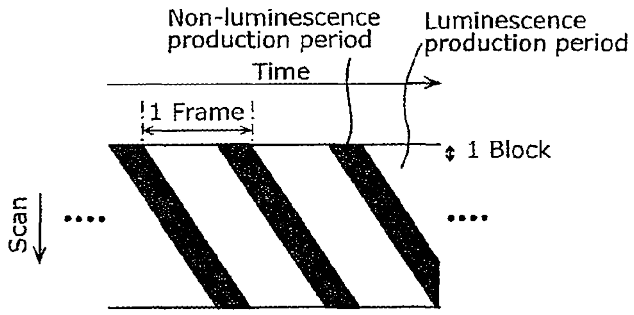
FIG. 11B is a state transition diagram of a drive block which produces luminescence according to the driving method according to the second embodiment of the present invention.

FIG. 11B is a state transition diagram of a drive block which produces luminescence according to the driving method according to the second embodiment of the present invention. In the figure, the luminescence production periods and the non-luminescence production periods of each drive block in a certain luminescence pixel column is shown. Plural drive blocks are shown in the vertical direction, and the horizontal axis shows time. Here, the non-luminescence production period includes the above-described threshold voltage correction period.

According to the driving method of the image display device according to the second embodiment of the present invention, luminescence production periods are sequentially set on a per luminescence pixel row basis even within the same drive block. Therefore, even within a drive block, the luminescence production periods appear in a continuous manner with respect to the scanning direction.

Thus, the drive transistor 114 threshold voltage correction periods as well as the timings thereof can also be made uniform within the same drive block in the second embodiment through the luminescence pixel circuit provided with the switching transistor 116 and electrostatic holding capacitor 118, and through the disposition of control lines, scanning lines, and signal lines to the respective luminescence pixels that have been formed into drive blocks. Therefore, the load on the scanning/control line drive circuit 14 which outputs signals for controlling current paths, and on the signal line drive circuit 15 which controls signal voltages is decreased. In addition, through the above-described forming of drive blocks and the two signal lines arranged for every luminescence pixel column, the drive transistor 114 threshold voltage correction period can take a large part of a 1 frame period Tf which is the time in which all the luminescence pixels are rewritten. This is because the threshold voltage correction period is provided in the (k+1)th drive block in the period in which the luminance signal is sampled in the kth drive block. Therefore, the threshold voltage correction period is not divided on a per luminescence pixel row basis, but is divided on a per drive block basis. Therefore, a long relative threshold voltage correction period can be set with respect to one frame period, without allowing luminescence duty to decrease with the increase in the display area. With this, a drive current based on luminance signal voltage that has been corrected with a high degree of precision flows to the luminescence elements, and thus image display quality improves.

For example, in the case where the display panel 10 is divided into N drive blocks, the threshold correction period allocated to each luminescence pixel is at most Tf/N.

Third Embodiment

The image display device in the present embodiment is a an image display device including luminescence pixels arranged in rows and columns, the image display device including: a first signal line and a second signal line each provided on a per luminescence pixel column basis; and a first control line provided on a per luminescence pixel column basis, wherein the luminescence pixels compose two or more drive blocks each including rows of the luminescence pixels, each of the luminescence pixels includes: a drive transistor; a first capacitor having two terminals with one of the terminals being connected to a gate of the drive transistor; a luminescence element connected to a source of the drive transistor; a third switch having one of a source and a drain connected to the other of the terminals of the first capacitor and the other of the source and the drain connected to the source of the drive transistor; and a second capacitor having two terminals with one of the terminals being connected to the other terminal of the first capacitor and the other terminal being connected to the first control line, each of the luminescence pixels that belong to a kth drive block (k is a positive integer) further includes a first switch provided between the first signal line and the gate of the drive transistor, each of the luminescence pixels that belong to a (k+1)th drive block further includes a second switch provided between the second signal line and the gate of the drive transistor, and each of the first control lines is shared by all of the luminescence pixels in a same one of the drive blocks. With this, the drive transistor threshold voltage correction periods as well as the luminescence periods can be made uniform within the drive block. Therefore, the circuit size of the drive circuit can be made smaller. Furthermore, since a long threshold voltage correction period can be taken with respect to one frame period, image display quality is improved.

Hereinafter, an embodiment of the present invention shall be described with reference to the Drawings.

The electrical configuration of the image display device according to the present embodiment is the same as the configuration shown in FIG. 1 except for the circuit configuration of the luminescence pixels. Specifically, the image display device according to the present embodiment includes the display panel 10, the timing control circuit 20, and the voltage control circuit 30. The display panel 10 includes plural luminescence pixels 21A and 21B which are to be described later, the signal line group 12, the control line group 13, the scanning/control line drive circuit 14, and the signal line drive circuit 15.

Description of configurations overlapping with those in the first and second embodiments shall be omitted, and configurations regarding the luminescence pixels 21A and 21B shall be described hereinafter.

The luminescence pixels 21A and 21B are arranged in rows and columns on the display panel 10. Here, the luminescence pixels 21A and 21B compose two or more drive blocks each of which is one drive block made up of plural luminescence pixel rows. The luminescence pixels 21A compose odd drive blocks and the luminescence pixels 21B compose even drive blocks.

Figure 12A:
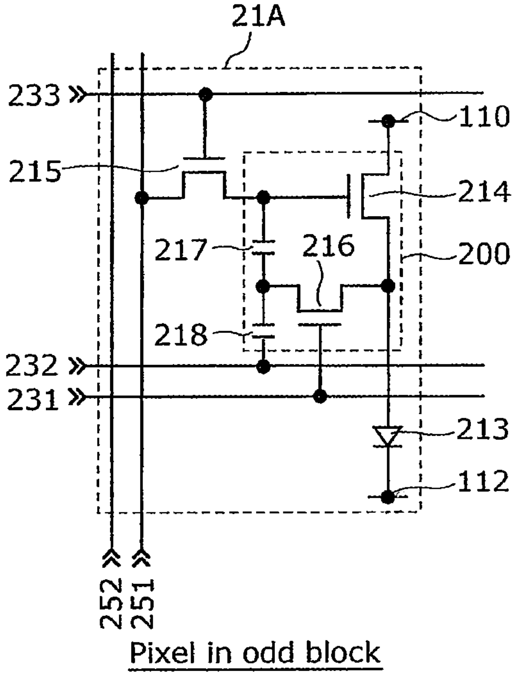
FIG. 12A is a specific circuit configuration diagram of a luminescence pixel of an odd drive block in an image display device according to a third embodiment of the present invention.
Figure 12B:
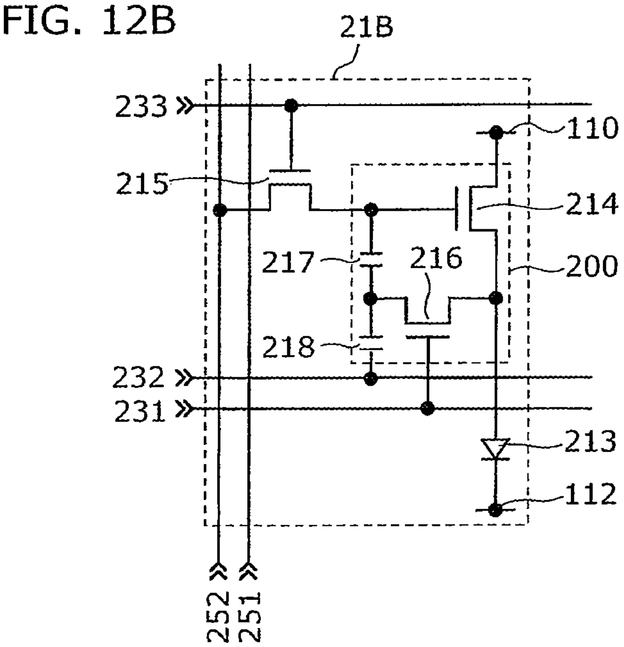
FIG. 12B is a specific circuit configuration diagram of a luminescence pixel of an even drive block in the image display device according to the third embodiment of the present invention.

FIG. 12A is a specific circuit configuration diagram of a luminescence pixel of an odd drive block in the image display device according to the third embodiment of the present invention, and FIG. 12B is a specific circuit configuration diagram of a luminescence pixel of an even drive block in the image display device according to the third embodiment of the present invention. Compared with the current control unit 100 in FIG. 2A and FIG. 2B in the first embodiment, a current control unit 200 shown in FIG. 12A and FIG. 12B is different in that electrostatic holding capacitors 217 and 218, and switching transistor 216 are implemented as a constituent element of the current control unit 200. Hereinafter, description of points that overlap with the configuration of the image display device shown in FIG. 2A and FIG. 2B shall be omitted.

In FIG. 12A and FIG. 12B, an organic EL element 213 is for example a luminescence element having a cathode connected to the power source line 112, which is a negative power source line, and an anode connected to the source of a drive transistor 214. The organic EL element 213 produces luminescence according to the flow of the drive current of the drive transistor 214.

The drive transistor 214 is a drive transistor having a drain connected to a power source line, and a source connected to the anode of the organic EL element 213. The drive transistor 214 converts a voltage corresponding to a signal voltage and applied between the gate and source into a drain current. Subsequently, the drive transistor 214 supplies this drain current, as a drive current, to the organic EL element 213.

A switching transistor 215 has a gate connected to a scanning line 233, one of a source and a drain connected to the gate of the drive transistor 214, the other of the source and the drain connected to a first signal line or a second signal line, and has a function of applying the reference voltage and the signal voltage to a intra-pixel node, within a one-frame period.

The switching transistor 216 has a gate connected to a second control line 231, one of a source and a drain connected to the other of terminals of the electrostatic holding capacitor 217, and the other of the source and the drain connected to the source of the drive transistor 214. By turning OFF in the period for writing the signal voltage from the signal line, the switching transistor 216 has a function of causing a voltage corresponding to an accurate signal voltage to be held in the electrostatic holding capacitor 217. Meanwhile, by turning ON in the threshold voltage detection period and the luminescence production period, the switching transistor 216 has a function of connecting the source of the drive transistor 214 to the electrostatic holding capacitors 217 and 218, causing a voltage corresponding to the threshold voltage and the signal voltage to be held in the electrostatic holding capacitor 217, and to cause the drive transistor 214 to supply the luminescence element with a drive current reflecting the voltage held in the electrostatic holding capacitor.

The electrostatic holding capacitor 217 is a first capacitor having one of terminals connected to the gate of the drive transistor 214 and the other of the terminals connected to one of the terminals of the electrostatic holding capacitor 218. The electrostatic holding capacitor 217 has a function of holding a charge corresponding to the signal voltage supplied from a first signal line 251 or a second signal line 252, and controlling a signal current supplied from the drive transistor 214 to the organic EL element 213 after the switching transistor 215 is turned OFF for example.

The electrostatic holding capacitor 218 is a second capacitor connected between the other of the terminals of the electrostatic holding capacitor 217 and a first control line 232. The electrostatic holding capacitor 218 has a function of, first, holding the source potential of the drive transistor 214 in the steady state, through the conductive state of the switching transistor 216, and then determining the voltage to be applied to the electrostatic holding capacitor 217 which corresponds to the voltage difference between the reference voltage and the luminance signal voltage in the first signal line or the second signal line, when the luminance signal voltage is applied from the switching transistor 215. It should be noted that the source potential in the steady state is the threshold voltage of the drive transistor 214. Subsequently, even when the timing from the holding of the aforementioned signal voltage to the production of luminescence is different for each of the luminescence pixel rows, the potential of the other of the terminals of the electrostatic holding capacitor 217 is fixed according to the electrostatic holding capacitor 218, and thus the potential of one of the terminals of the electrostatic holding capacitor 217 is also fixed, and the gate voltage of the drive transistor 214 is fixed. Meanwhile, since the source potential of the drive transistor 214 is already steady, the electrostatic holding capacitor 218 consequently has a function of holding the source potential of the drive transistor 214.

The second control line 231 is connected to the scanning/control line drive circuit 14, and is connected to the respective luminescence pixels belonging to the pixel row including either the pixel elements 21A or 21B. With this, the second control line 231 has a function of selecting a conductive or non-conductive state between the source of the drive transistor 214 and the node between the electrostatic holding capacitor 217 and the electrostatic holding capacitor 218.

The first control line 232 is connected to the scanning/control line drive circuit 14, and is connected to the respective luminescence pixels belonging to the pixel row including either the pixel elements 21A or 21B. With this, the first control line 232 has a function of adjusting an environment for detecting the threshold voltage of the drive transistor 214, by switching voltage levels.

The scanning line 233 has a function of supplying the respective luminescence pixels belonging to the pixel row including either the pixel elements 21A or 21B with the timing for writing a signal voltage which is the luminance signal voltage or the reference voltage.

Each of the first signal line 251 and the second signal line 252 is connected to the signal line drive circuit 15 and the respective luminescence pixels belonging to the pixel column including the pixel elements 21A or 21B, and has a function of supplying: the reference voltage for detecting the threshold voltage of the drive TFT; and the signal voltage which determines luminance intensity.

It should be noted that, although not shown in FIG. 12A and FIG. 12B, each of the power source lines 110 and 112 is also connected to other luminescence pixels, and to a voltage source.

Next, the inter-luminescence pixel connection relationship of the second control line 231, the first control line 232, the scanning line 233, the first signal line 251, and the second signal line 252 shall be described.

Figure 13:
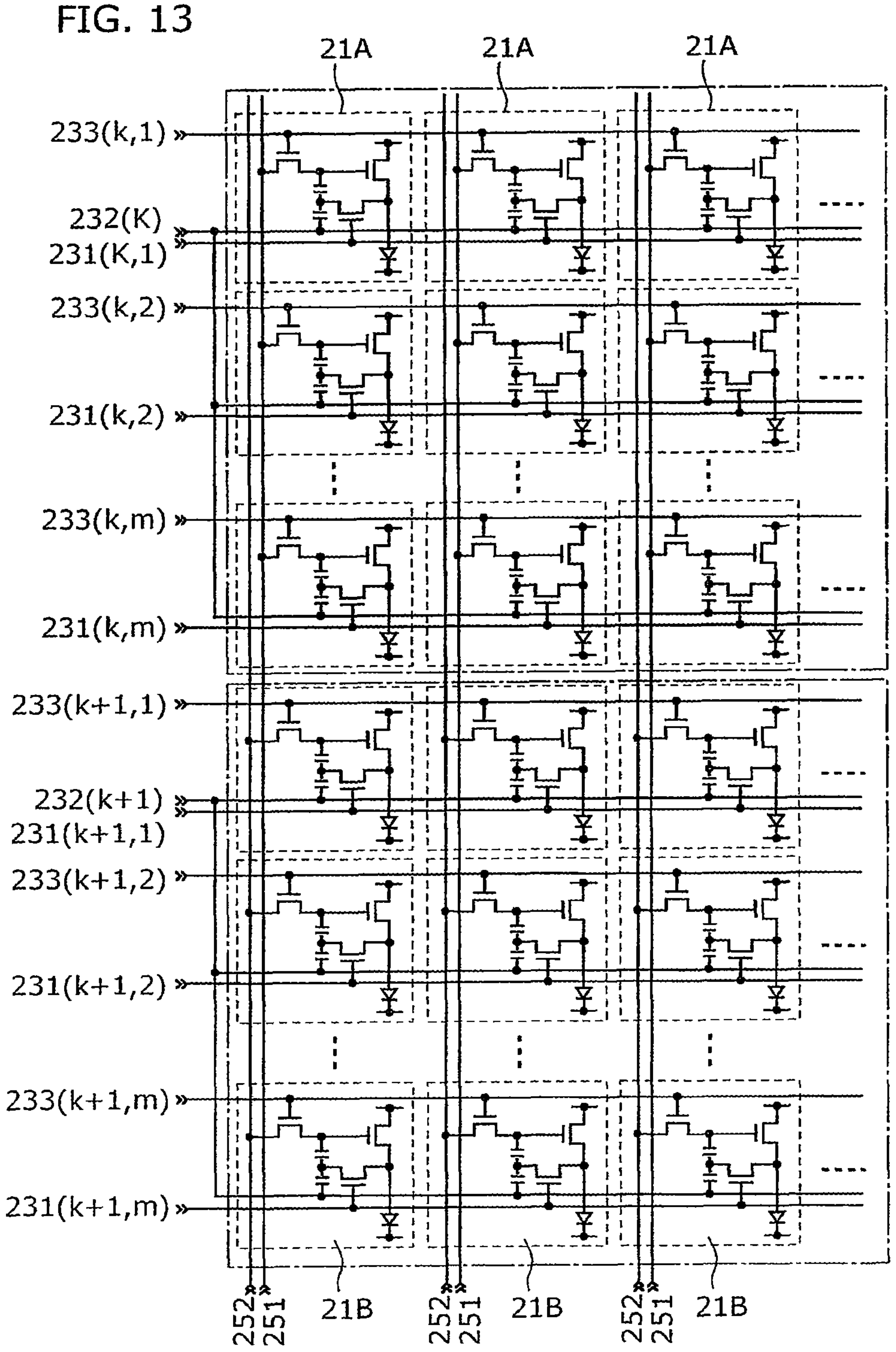
FIG. 13 is a circuit configuration diagram showing part of a display panel included in the image display device according to the third embodiment of the present invention.

FIG. 13 is a circuit configuration diagram showing part of the display panel included in the image display device according to the third embodiment of the present invention. The figure shows two adjacent drive blocks and respective control lines, respective scanning lines, and respective signal lines. In the figure and the subsequent description, the respective control lines, respective scanning lines, and respective signal lines shall be represented by "reference number (block number; row number of the block)" or "reference number (block number)".

As previously described, a drive block includes plural luminescence pixel rows, and there are two or more drive blocks within the display panel 10. For example, each of the drive blocks shown in FIG. 13 includes m rows of luminescence pixel rows.

In the kth drive block shown at the top stage of FIG. 13, each of the second control lines 231(*k,* 1) to 231(*k, m*) are disposed to a corresponding one of the luminescence pixel rows in the drive block and is separately connected to the gates of the switching transistors 216 included in the respective luminescence pixels 21A. Furthermore, the first control line 232(*k*) is connected in common to the respective electrostatic holding capacitors 218 included in all the luminescence pixels 21A in the drive block. Meanwhile, each of the scanning lines 233(*k,* 1) to 233 (*k, m*) are separately connected on a per luminescence pixel row basis.

Furthermore, the same connections as those in the kth drive block are also carried out on the (k+1)th drive block shown in the bottom stage of FIG. 13. However, the first control line 232(*k*) connected to the kth drive block and the first control line 232 (*k*+1) connected to the (k+1)th drive block are different control lines, and separate control signals are outputted from the scanning/control line drive circuit 14.

Furthermore, in the kth drive block, the first signal line 251 is connected to the other of the source and drain of the respective switching transistors 215 included in all of the luminescence pixels 21A in the drive block. Meanwhile, in the (k+1)th drive block, the second signal line 252 is connected to the other of the source and drain of the respective switching transistors 215 included in all of the luminescence pixels 21B in the drive block.

With the above-described formation of drive blocks, the number of first control lines 232 for controlling the respective Vth detection circuits is reduced. Therefore, the load on the scanning/control line drive circuit 14 which outputs drive signals to these control lines is reduced. Furthermore, a long Vth detection period can ire secured, Vth detection precision becomes higher, and the consequent display quality improves.

Figure 14A:
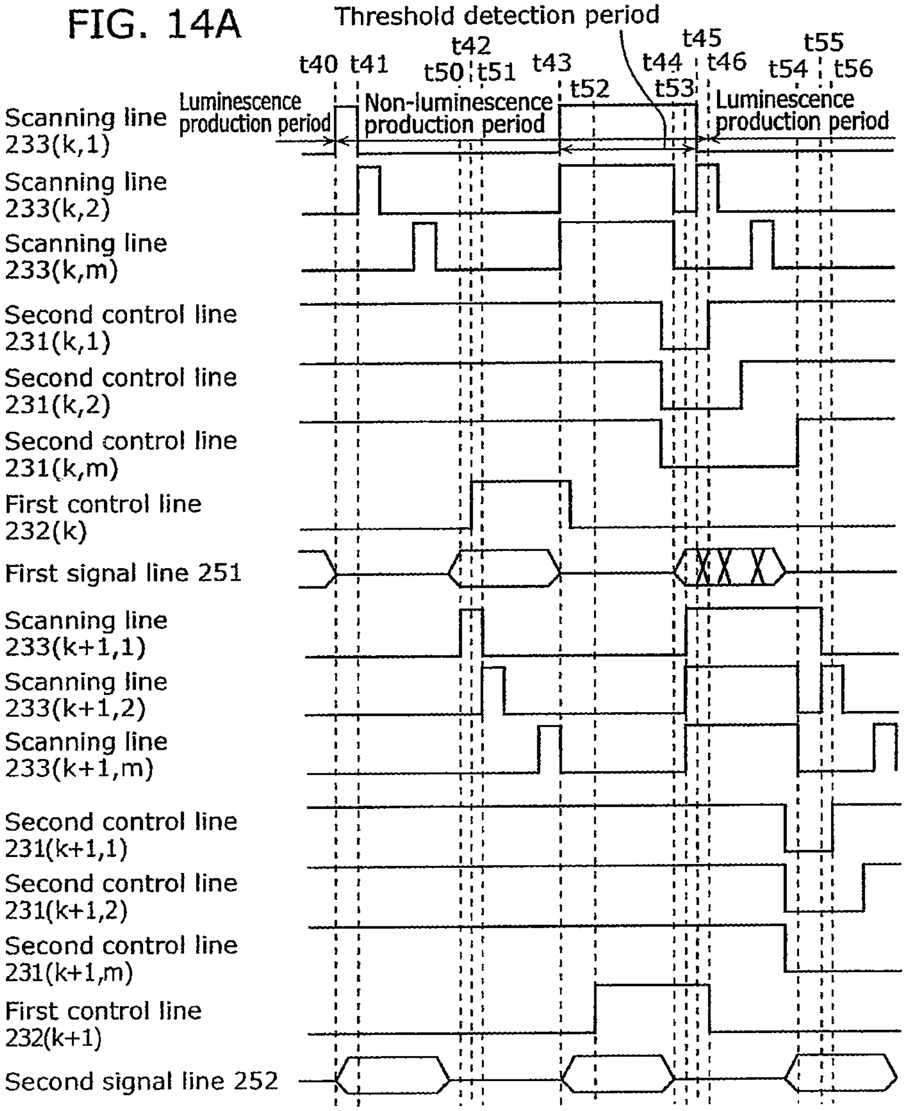
FIG. 14A is an operation timing chart for a driving method of an image display device according to the third embodiment of the present invention.

Next, the driving method of the image display device according to the present embodiment shall be described using FIG. 14A. It should be noted that, here, the driving method of the image display device including the specific circuit configuration shown in FIG. 12A and FIG. 12B shall be described in detail.

FIG. 14A is an operation timing chart for the driving method of the image display device according to the third embodiment of the present invention. In the figure, the horizontal axis denotes time. Furthermore, in the vertical direction, the waveform diagrams of the voltage generated in the scanning lines 233(*k,* 1), 233(*k,* 2), and 233(*k, m*), the second control lines 231(*k,* 1), 231(*k,* 2), and 231(*k, m*), the first control line 232(*k*), and the first signal line 251 of the kth drive block are shown in sequence from the top. Furthermore, continuing therefrom, the waveform diagrams of the voltage generated in the scanning lines 233(*k*+1, 1), 233(*k*+1, 2), and 233(*k*+1, *m*), the second control lines 231(*k*+1, 1), 231(*k*+1, 2), and 231(*k*+1, *m*), the first control line 232(*k*+1), and the second signal line 252 of the (k+1)th drive block are shown.

Figure 15:
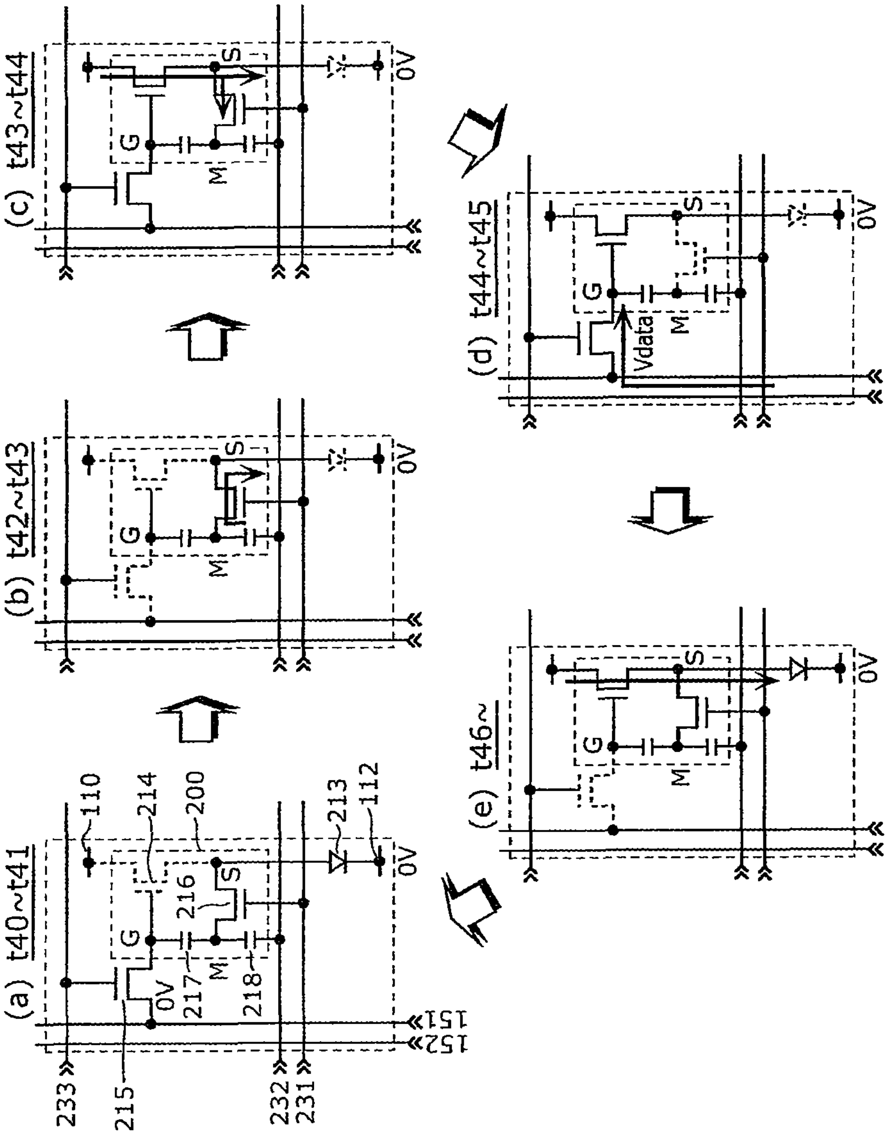
FIGS. 15(*a*), 15(*b*), 15(*c*), 15(*d*), and 15(*e*) are state transition diagrams for a luminescence pixel included in the image display device according to the third embodiment of the present invention.

Furthermore, FIG. 15 is a state transition diagram for a luminescence pixel included in the image display device according to the third embodiment of the present invention. Furthermore, FIG. 16 is an operation flowchart for the image display device according to the third embodiment of the present invention.

Figure 16:
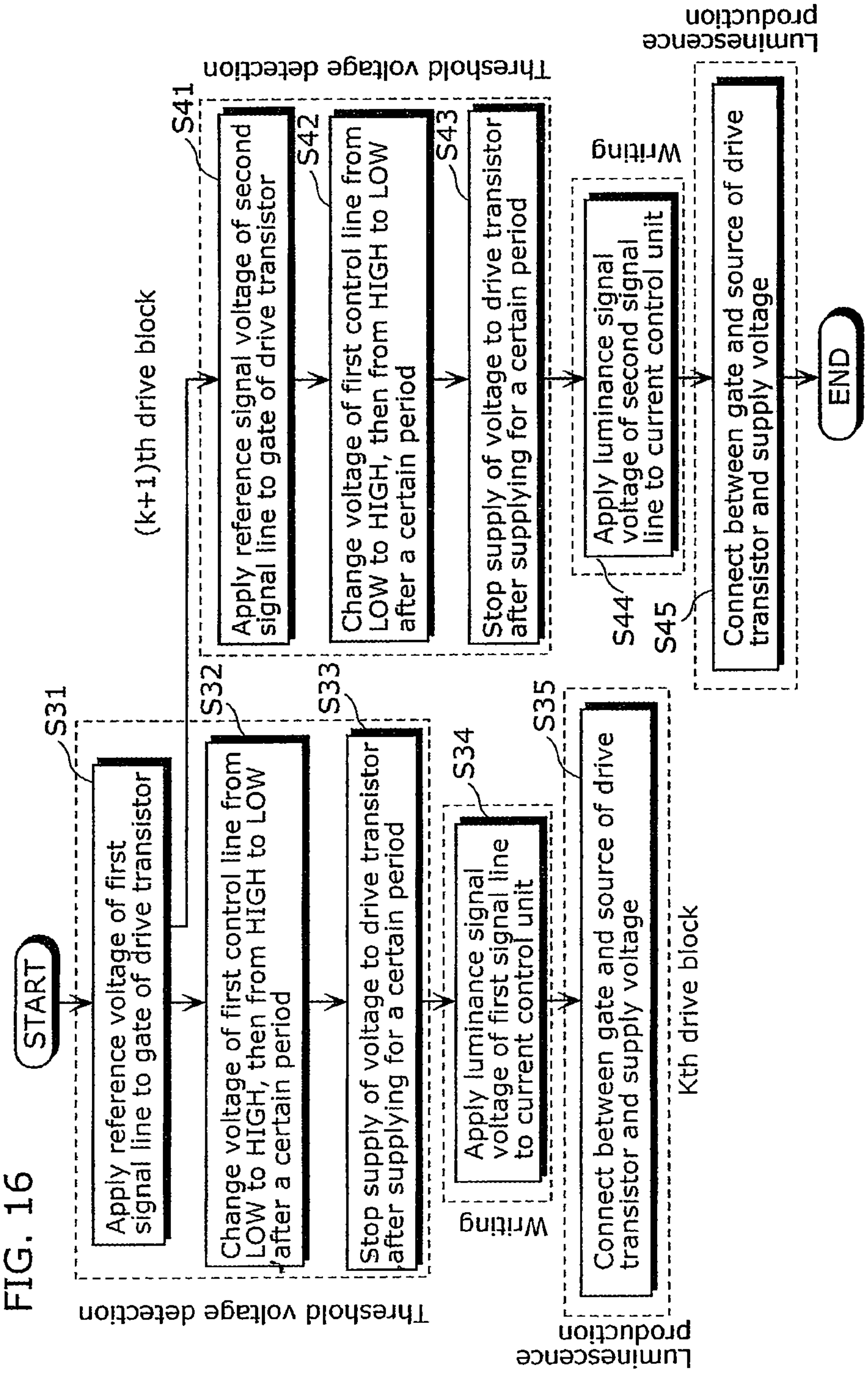
FIG. 16 is an operation flowchart for the image display device according to the third embodiment of the present invention.

First, at a time t40, the scanning/control line drive circuit 14 causes the voltage level of the scanning line 233(*k,* 1) to change to HIGH, and the reference voltage is applied from the first signal line 251 to the gate of the drive transistor 214 (S31 in FIG. 16). At this time, as shown in (a) in FIG. 15, the reference voltage is for example 0 V. Furthermore, since operation is in the luminescence production mode immediately before the time t40, the source potential Vs of the drive transistor 214 in this steady state is assumed to be $V_{EL}$. Because of this and because the switching transistor 216 is in a conductive state due to the voltage level of the second control line 231(*k,* 1) being in a HIGH state, $Vgs=-V_{EL}<VT$ (TFT) and the transistor 214 changes to the OFF state.

Subsequently, with the scanning/control line drive circuit 14 causing the voltage level of the second control line 231(*k,* 1) to change to LOW at a time t41, and thereafter causing the voltage level of the scanning line 233 to change from LOW to HIGH to LOW in pixel row sequence while maintaining the first signal line 251 at the reference voltage within the kth block, the organic EL elements 213 stop producing luminescence in pixel row sequence. In other words, the luminescence production of the luminescence pixels in the kth block ends in pixel row sequence. At the same time, the non-luminescence production period of the kth block begins in pixel row sequence.

Next, at a time t42, the scanning/control line drive circuit 14 causes the voltage level of the first control line 232(*k*) to change from LOW to HIGH, then causes the voltage level to change to LOW after a certain period of time has passed (S32 in FIG. 16). Furthermore, at this time, the voltage levels of the second control lines 231(*k,* 1) to 231(*k, m*) are maintained at HIGH. Here, for example, it is assumed that the switching transistor 215 is OFF, the first control line 232(*k*) is changed by the amount of $\Delta$Vreset (>0), the electrostatic capacitance of the electrostatic holding capacitor 218 is C2, and the electrostatic capacitance and threshold voltage of the organic EL element 213 are $C_{EL}$ and $V_T$(EL), respectively. At this time, at the moment when the scanning/control line drive circuit 14 changes the voltage level of the first control line 232(*k*) from LOW to HIGH, the potential Vs of the source electrode S (M) of the drive transistor 214 is approximately equal to the sum of the potential distributed between C2 and $C_{EL}$ and $V_T$(EL), and is obtained as below.

[Math 11]

$$V_S = \frac{C_2}{C_2 + C_{EL}}\Delta V_{reset} + V_{T(EL)} \quad \text{(Expression 11)}$$

Subsequently, as shown in (b) in FIG. 7, due to the self-discharging of the organic EL element 213, the aforementioned Vs becomes asymptotic to $V_T$(EL), in the steady state.

Next, at a time t43, the scanning/control line drive circuit 14 causes the voltage levels of the scanning lines 233(*k*, 1) to 233(*k*, *m*) to concurrently change to HIGH.

Next, the scanning/control line drive circuit 14 causes the voltage level of the first control line 232(*k*) to change from HIGH to LOW, thereby Vs is biased, and is obtained as below.

[Math 12]

$$V_S = V_{T(EL)} - \frac{C_2}{C_1 + C_2 + C_{EL}}\Delta V_{reset} \quad \text{(Expression 12)}$$

The changing of the voltage level of the first control line 232(*k*) from HIGH to LOW causes a voltage that is higher than the threshold voltage Vth of the drive transistor 214 to be generated in Vgs which is the gate-source voltage of the drive transistor 214. Specifically, the potential difference generated in the electrostatic holding capacitor 217 is set to a potential difference which allows for the detection of the threshold voltage of the drive transistor 214, thereby completing the preparation for the threshold voltage detection process. At the same time, as shown in (c) in FIG. 15, the drive transistor 214 turns ON and supplies the drain current to the electrostatic holding capacitors 217 and 218 and the organic EL element 213. At this time, Vs defined in Expression 2 becomes asymptotic to −Vth. With this, Vth of the drive transistor 214 is recorded in the electrostatic holding capacitors 217 and 218. It should be noted that, at this time, the current flowing to the organic EL element 213 is insufficient as a current for causing the organic EL element to produce luminescence since the anode electrode potential is a potential lower than −Vth and the cathode electrode potential is 0 V, and thus the organic EL element 213 is inversely-biased.

In the period from the time t43 to a time t44, the circuit of the luminescence pixel 21A becomes steady, and a voltage equivalent to the threshold voltage Vth of the drive transistor 214 is held in the electrostatic holding capacitors 217 and 218. It should be noted that, since the flowing current for causing the voltage equivalent to the threshold voltage Vth to be held in the electrostatic holding capacitors 217 and 218 is minute, reaching the steady state takes time. Therefore, the longer this period is, the more stable the voltage held in the electrostatic holding capacitor 217 becomes, and by ensuring that this period is sufficiently long, voltage compensation having high-precision is realized.

Next, at a time t44, the scanning/control line drive circuit 14 causes the voltage levels of the scanning lines 233(*k*, 1) to 233(*k*, *m*) to concurrently change from HIGH to LOW (S33 in FIG. 16). With this, the recording of the Vth of the drive transistor 214 in the electrostatic holding capacitors 217 and 218 is completed. At this time, the voltage equivalent to the threshold voltage Vth of the drive transistor 214 is simultaneously held in the respective electrostatic holding capacitors 217 and 218 included in all of the luminescence pixels 21A of the kth drive block. It should be noted that immediately before the time t44, the second control lines 231(*k*, 1) to 231(*k*, *m*) are concurrently changed to the LOW level, and the respective switching transistors 216 are OFF. With this, the leak current of the drive transistor 214 after Vth detection flows to the electrostatic holding capacitors 217 and 218 and suppresses deviations in the value of threshold voltage Vth of the drive transistor 214 recorded in the electrostatic holding capacitors 217 and 218.

As described thus far, in the period from the time t43 to the time t44, the correction of the threshold voltage Vth of the drive transistor 214 is executed simultaneously in the kth drive block.

Next, in a period from the time t44 onward, the scanning/control line drive circuit 14 causes the voltage levels of the scanning lines 233(*k*, 1) to 233(*k*, *m*) to sequentially change from LOW to HIGH to LOW so as to sequentially turn ON the switching transistors 215 on a per luminescence pixel row basis. Furthermore, at this time, the signal line drive circuit 15 causes the signal voltage of the first signal line 251 to change to the luminance signal voltage Vdata corresponding to the luminance value of the respective pixels (S34 in FIG. 16). With this, as shown in (d) in FIG. 15, the luminance signal voltage Vdata is applied to the gate of the drive transistor 214. At this time, the potential $V_M$ at the connection point between the electrostatic holding capacitors 217 and 218 becomes the sum of the voltage when Vdata is distributed between C1 and C2 and −Vth which is the Vs potential at the time t44, and is obtained as below.

[Math 13]

$$V_M = \frac{C_1}{C_1 + C_2}\Delta V_{data} - V_{th} = \frac{C_1}{C_1 + C_2}(V_{data} - 0) - V_{th} = \frac{C_1}{C_1 + C_2}V_{data} - V_{th} \quad \text{(Expression 13)}$$

In other words, the potential difference $V_{gM}$ held in the electrostatic holding capacitor 217 is the difference between Vdata and the potential defined in aforementioned Expression 13, and is obtained as below.

[Math 14]

$$V_{gM} = \frac{C_2}{C_1 + C_2}V_{data} + V_{th} \quad \text{(Expression 14)}$$

In other words, a summed voltage obtained by adding a voltage corresponding to this luminance signal voltage Vdata and the voltage equivalent to the previously held threshold voltage Vth of the drive transistor 214 is written into the electrostatic holding capacitor 217.

Furthermore, in a period from a time t46 onward, the scanning/control line drive circuit 14 causes the voltage levels of the second control lines 231(*k*, 1) to 231(*k*, *m*) to sequentially change from LOW to HIGH so as to sequentially turn ON the respective switching transistors 216 on a per luminescence pixel row basis (S35 in FIG. 16). With this, luminescence production corresponding to the threshold-corrected signal voltage is executed on a per pixel row basis through the application of the voltage defined in Expression 13 between the gate and source of the drive transistor 214, and the flowing of the drain current shown in (e) in FIG. 15.

As described thus far, in a period from the time t46 onward, the writing of the corrected luminance signal voltage and luminescence production is sequentially executed in the kth drive block on a per luminescence pixel row basis.

Here, the drain current id flowing in the drive transistor 214 is expressed below by using a voltage value obtained by deducting the threshold voltage Vth of the drive transistor 214 from the $V_{gM}$ defined in Expression 13.

[Math 15]

$$i_d = \frac{\beta}{2}\left(\frac{C_2}{C_1 + C_2} V_{data}\right) \quad \text{(Expression 15)}$$

Here, β is a characteristic parameter regarding mobility. It can be seen from Expression 15 that the drain current id for causing the organic EL element 213 to produce luminescence is a current that that is not dependent on the threshold voltage Vth of the drive transistor 214 and, in addition, has no relationship with the capacitance element of the organic EL element 213.

As described thus far, by forming the luminescence pixel rows into drive blocks, the correction of the threshold voltage Vth of the drive transistors 214 is executed simultaneously in the respective drive blocks. With this, the control of the current path from the source of such drive current onward can be synchronized in the respective drive blocks. Therefore, the first control line 232 can be shared in each of the drive blocks.

Furthermore, although the scanning lines 233(*k*, 1) to 233 (*k*, *m*) are separately connected to the scanning/control line drive circuit 14, the timing of the drive pulse in the threshold voltage compensation period is the same. Therefore, the scanning/control line drive circuit 14 can suppress the rising of the frequency of the pulse signals to be outputted, and thus the output load on the drive circuit is decreased.

From the same perspective as the first embodiment, the present embodiment also has the advantage that luminescence duty can be secured longer compared to the conventional image display device using two signal lines.

Therefore, it is possible to realize an image display device that ensures sufficient luminescence luminance and has long operational life due to reduced output load on drive circuits.

Furthermore, it is understood that when the same luminescence duty is set to the conventional image display device using two signal lines and the image display device combining block driving as in the present invention, the image display device according to the present invention ensures a longer threshold detecting time.

The driving method of the image display device according to the present embodiment shall be described once again.

Meanwhile, at a time t50, the correction of the threshold voltage of the drive transistors 214 in the (k+1)th drive block begins.

First, at the time t50, the scanning/control line drive circuit 14 causes the voltage level of the scanning line 233(*k*+1, 1) to change to HIGH, and the reference voltage is applied from the second signal line 252 to the gate of the drive transistor 214 (S41 in FIG. 16).

Subsequently, with the scanning/control line drive circuit 14 causing the voltage level of the scanning line 233(*k*+1, 1) to change to LOW at a time t51, and thereafter causing the voltage level of the scanning line 233 to change from LOW to HIGH to LOW in pixel row sequence while maintaining the second signal line 252 at the reference voltage within the (k+1)th block, the organic EL elements 213 stop producing luminescence in pixel row sequence. In other words, the luminescence production of the luminescence pixels in the (k+1, 1)th block ends in pixel row sequence. At the same time, the non-luminescence production period of the (k+1, 1)th block begins in pixel row sequence.

Next, at a time t52, the scanning/control line drive circuit 14 causes the voltage level of the first control line 232(*k*+1, 1) to change from LOW to HIGH, then causes the voltage level to change to LOW after a certain period of time has passed (S42 in FIG. 16). Furthermore, at this time, the voltage levels of the second control lines 231(*k*+1, 1) to 231(*k*+1, *m*) are maintained at HIGH.

Next, at a time t53, the scanning/control line drive circuit 14 causes the voltage levels of the scanning lines 233(*k*+1, 1) to 233(*k*+1, *m*) to concurrently change to HIGH.

Next, the scanning/control line drive circuit 14 causes the voltage level of the first control line 232(*k*+1) to change from HIGH to LOW, thereby Vs is biased. The changing of the voltage level of the first control line 232(*k*) from HIGH to LOW causes a voltage that is higher than the threshold voltage Vth of the drive transistor 214 to be generated in Vgs which is the gate-source voltage of the drive transistor 214. Specifically, the potential difference generated in the electrostatic holding capacitor 217 is set to a potential difference which allows for the detection of threshold voltage of the drive transistor 214, thereby completing the preparation for the threshold voltage detection process.

At the same time, as shown in (c) in FIG. 15, the drive transistor 214 turns ON and supplies the drain current to the electrostatic holding capacitors 217 and 218 and the organic EL element 213. At this time, Vs becomes asymptotic to −Vth. With this, Vth of the drive transistor 214 is recorded in the electrostatic holding capacitors 217 and 218. It should be noted that, at this time, the current flowing to the organic EL element 213 is insufficient as a current for causing the organic EL element to produce luminescence since the anode electrode potential is a potential lower than −Vth and the cathode electrode potential is 0 V, and thus the organic EL element 213 is inversely-biased.

In the period from the time t53 to a time t54, the circuit of the luminescence pixel 21A becomes steady, and a voltage equivalent to the threshold voltage Vth of the drive transistor 214 is held in the electrostatic holding capacitors 217 and 218. It should be noted that, since the flowing current for causing the voltage equivalent to the threshold voltage Vth to be held in the electrostatic holding capacitors 217 and 218 is minute, reaching the steady state takes time. Therefore, the longer this period is, the more stable the voltage held in the electrostatic holding capacitor 217 becomes, and by ensuring that this period is sufficiently long, voltage compensation having high-precision is realized.

Next, at a time t54, the scanning/control line drive circuit 14 causes the voltage levels of the scanning lines 233(*k*+1, 1) to 233(*k*+1, *m*) to concurrently change from HIGH to LOW (S43 in FIG. 16). With this, the recording of the Vth of the drive transistor 214 in the electrostatic holding capacitors 217 and 218 is completed. At this time, the voltage equivalent to the threshold voltage Vth of the drive transistor 214 is simultaneously held in the respective electrostatic holding capacitors 217 and 218 included in all of the luminescence pixels 21B of the (k+1)th drive block. It should be noted that immediately before the time t44, the second control lines 231(*k*+1, 1) to 231(*k*+1, *m*) are concurrently changed to the LOW level, and the respective switching transistors 216 are OFF. With this, the leak current of the drive transistor 214 after Vth detection flows to the electrostatic holding capacitors 217 and 218 and suppresses deviations in the value of threshold voltage Vth of the drive transistor 214 recorded in the electrostatic holding capacitors 217 and 218.

As described thus far, in the period from the time t53 to the time t54, the correction of the threshold voltage Vth of the drive transistor 214 is executed simultaneously in the (k+1)th drive block.

Next, in a period from the time t54 onward, the scanning/control line drive circuit 14 causes the voltage levels of the scanning lines 233(*k*+1, 1) to 233(*k*+1, *m*) to sequentially change from LOW to HIGH to LOW so as to sequentially turn ON the switching transistors 215 on a per luminescence pixel row basis. Furthermore, at this time, the signal line drive circuit 15 causes the signal voltage of the second signal line 252 to change to the luminance signal voltage Vdata corresponding to the luminance value of the respective pixels (S44 in FIG. 16). With this, as shown in (d) in FIG. 15, the luminance signal voltage Vdata is applied to the gate of the drive transistor 214.

Here, a summed voltage obtained by adding a voltage corresponding to this luminance signal voltage Vdata and the voltage equivalent to the previously held threshold voltage Vth of the drive transistor 114 is written into the electrostatic holding capacitor 217.

Furthermore, in a period from a time t56 onward, the scanning/control line drive circuit 14 causes the voltage levels of the second control lines 231(*k*+1, 1) to 231(*k*+1, *m*) to sequentially change from LOW to HIGH so as to sequentially turn ON the respective switching transistors 216 on a per luminescence pixel row basis (S45 in FIG. 16). With this, luminescence production corresponding to the threshold-corrected signal voltage is executed on a per pixel row basis through the application of the voltage defined in Expression 13 between the gate and source of the drive transistor 214, and the flowing of the drain current shown in (e) in FIG. 15.

As described thus far, in the period from the time t56 onward, the writing of the corrected luminance signal voltage and luminance production are sequentially executed in the (k+1)th drive block on a per luminescence pixel row basis.

The operations described thus far are also executed sequentially in the (k+2)th drive block onward in the display panel 10.

Figure 14B:
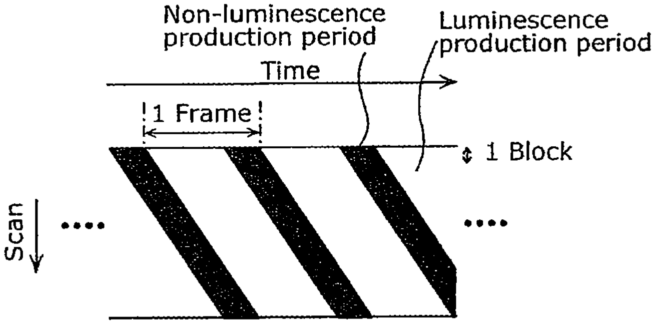
FIG. 14B is a state transition diagram of a drive block which produces luminescence according to the driving method according to the third embodiment of the present invention.

FIG. 14B is a state transition diagram of a drive block which produces luminescence according to the driving method according to the third embodiment of the present invention. In the figure, the luminescence production periods and the non-luminescence production periods of each drive block in a certain luminescence pixel column is shown. Plural drive blocks are shown in the vertical direction, and the horizontal axis shows time. Here, the non-luminescence production period includes the above-described threshold voltage correction period.

According to the driving method of the image display device according to third embodiment of the present invention, the luminescence production periods are sequentially set on a per luminescence pixel row basis even within the same drive block. Therefore, even within a drive block, the luminescence production periods appear in a continuous manner with respect to the scanning direction.

Thus, the drive transistor 214 threshold voltage correction periods as well as the timings thereof can also be made uniform within the same drive block in the third embodiment through the luminescence pixel circuit provided with the switching transistor 216 and electrostatic holding capacitor 218, and through the disposition of control lines, scanning lines, and signal lines to the respective luminescence pixels that have been formed into drive blocks. Therefore, the load on the scanning/control line drive circuit 14 which outputs signals for controlling current paths, and on the signal line drive circuit 15 which controls signal voltages is decreased. In addition, through the above-described forming of drive blocks and the two signal lines arranged for every luminescence pixel column, the drive transistor 214 threshold voltage correction period can take a large part of a 1 frame period Tf which is the time in which all the luminescence pixels are rewritten. This is because the threshold voltage correction period is provided in the (k+1)th drive block in the period in which the luminance signal is sampled in the kth drive block. Therefore, the threshold voltage correction period is not divided on a per luminescence pixel row basis, but is divided on a per drive block basis. Therefore, a long relative threshold voltage correction period can be set with respect to one frame period, without allowing luminescence duty to decrease with the increase in the display area. With this, a drive current based on luminance signal voltage that has been corrected with a high degree of precision flows to the luminescence elements, and thus image display quality improves.

For example, in the case where the display panel 10 is divided into N drive blocks, the threshold correction period allocated to each luminescence pixel is at most Tf/N.

Although the first to third embodiments have been described thus far, the image display device according to the present invention is not limited to the above-described embodiments. The present invention includes other embodiments implemented through a combination of arbitrary components of the first to third embodiments, or modifications obtained through the application of various modifications to the first to sixth embodiments and the modifications thereto, that may be conceived by a person of ordinary skill in the art, that do not depart from the essence of the present invention, or various devices in which the image display device according to the present invention is built into.

It should be noted that although, in the aforementioned embodiments, description is carried out under the assumption that the switching transistors are n-type transistors which turn ON when the voltage level of the gate of switching transistor is HIGH, the same advantageous effect is produced as in the respective embodiments even with an image display device in which the switching transistors are configured of p-type transistors and the polarity of the scanning are reversed.

Furthermore, although in the above-described embodiments the cathode-side of the respective organic EL elements is connected in common with another pixel, the same advantageous effect is produced as in the respective embodiments even with an image display device in which the anode-side is shared and the cathode-side is connected to a pixel circuit.

Figure 17:
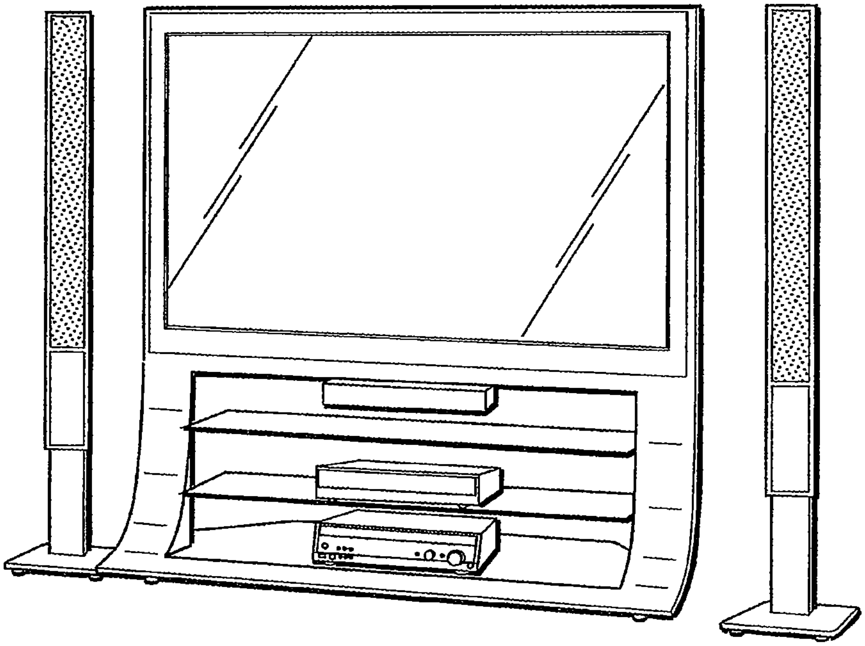
FIG. 17 is an outline view of a thin, flat TV in which the image display device according to the present invention is built into.
Figure 18:
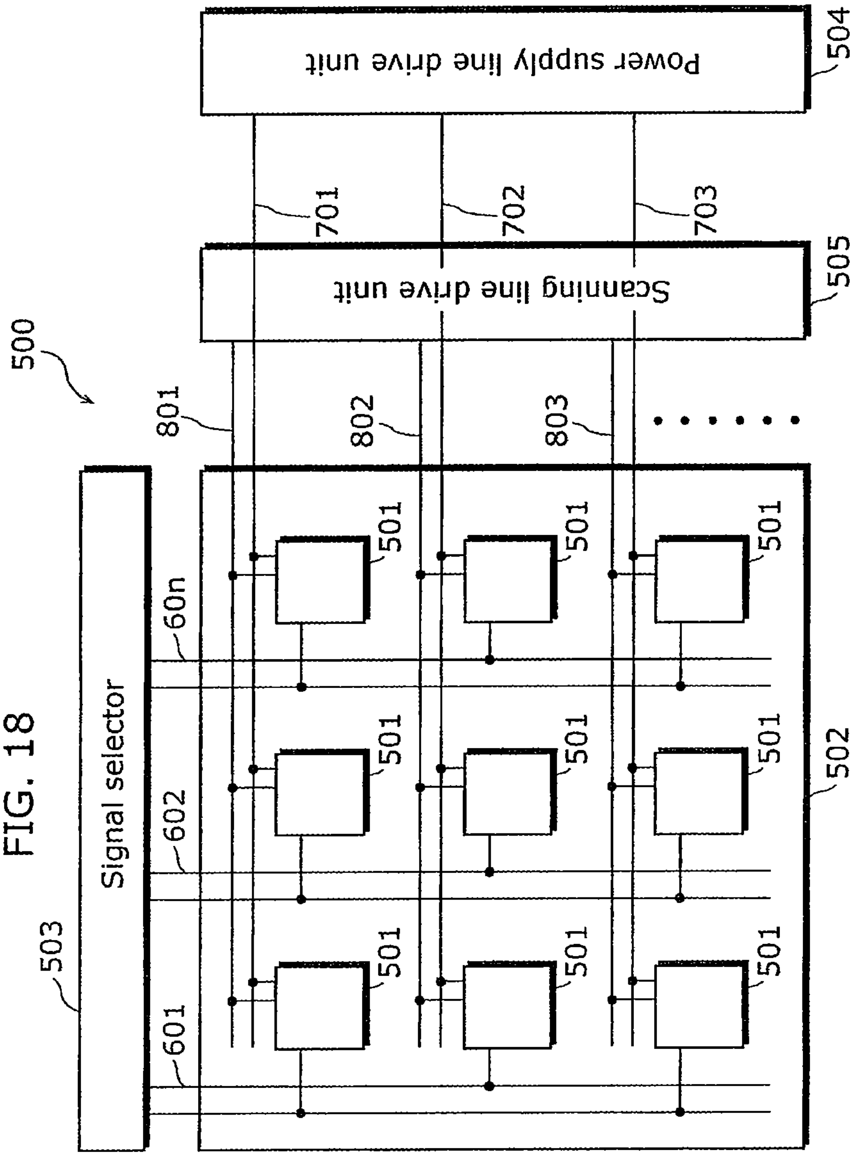
FIG. 18 is a block diagram showing the configuration of a conventional image display device disclosed in Patent Reference 1.

Furthermore, for example, the image display device according to the present invention is built into a thin, flat TV shown in FIG. 17. A thin, flat TV capable of high-accuracy image display reflecting a video signal is implemented by having the image display device according to the present invention built into the TV.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is particularly useful in an active-type organic EL flat panel display which causes luminance to fluctuate by controlling pixel luminescence production intensity according to a pixel signal current.

What is claimed is:

1. An image display device including luminescence pixels arranged in rows and columns, the image display device comprising:

a first power source line and a second power source line;

a first signal line and a second signal line for supplying the luminescence pixels with a signal voltage that determines luminance of the luminescence pixels;

a signal line driver that outputs the signal voltage to the first signal line and the second signal line;

a timing controller that controls a timing at which the signal line driver outputs the signal voltage;

scanning lines, each for one of the rows; and first control lines, wherein the luminescence pixels compose at least two drive blocks, each including luminescence pixels in at least two of the rows, each of the luminescence pixels includes:

a luminescence element that includes luminescence terminals, one of the luminescence terminals being connected to the second power source line, the luminescence element producing a luminance according to a flow of a signal current corresponding to the signal voltage; and a current controller connected to the first power source line, another of the luminescence terminals, and a corresponding one of the first control lines, the current controller being configured to convert the signal voltage into the signal current, the current controller includes:

a drive transistor that includes one of a drive transistor source and a drive transistor drain that is connected to the other of the luminescence terminals and converts the signal voltage applied between a drive transistor gate and the drive transistor source into a drain current;

a first capacitor that includes first capacitor terminals, one of the first capacitor terminals being connected to the drive transistor gate, the other of the first capacitor terminals being connected to the drive transistor source; and a second capacitor that includes second capacitor terminals, one of the second capacitor terminals being connected to the drive transistor source, the other of the second capacitor terminals being connected to the corresponding one of the first control lines;

each of the luminescence pixels in a $k^{th}$ one of the drive blocks further includes:

a first switch being a switching transistor and including a first switch gate connected to a corresponding one of the scanning lines, one of a first switch source and a first switch drain being connected to the first signal line, and another of the first switch source and the first switch drain being connected to the drive transistor gate of the current controller, the first switch switchably interconnecting the first signal line and the current controller, each of the luminescence pixels that belong to a $(k+1)^{th}$ one of the drive blocks further includes:

a second switch being a switching transistor and including a second switch gate connected to a corresponding one of the scanning lines, one of a second switch source and a second switch drain being connected to the second signal line, and another of the second switch source and the second switch drain being connected to the drive transistor gate of the current controller, the second switch switchably interconnecting the second signal line and the current controller, each of the first control lines is connected to the luminescence pixels in a same one of the drive blocks and not connected to the luminescence pixels in different ones of the drive blocks, k is a positive integer, a threshold voltage correction period of the $(k+1)^{th}$ drive block is provided in a signal voltage storing period of the $k^{th}$ drive block, the signal voltage includes a luminance signal voltage for causing the luminescence element to produce the luminescence, and a reference voltage for causing the first capacitor to store a voltage corresponding to a threshold voltage of the drive transistor, and the timing controller is configured to mutually and exclusively output the luminance final voltage and the reference voltage to the first signal line and the second signal line.

2. The image display device according to claim 1, further comprising:

second control lines, wherein the current controller further includes:

a fourth switch that includes a fourth switch gate connected to a corresponding one of the second control lines, a fourth switch source and a fourth switch drain being provided between the first power source line and the other of the luminescence terminals, and switches the drain current of the drive transistor ON and OFF.

3. The image display device according to claim 2, further comprising:

a driver that drives the luminescence pixels by controlling the first signal line, the second signal line, the first control lines, the second control lines, and the scanning lines, wherein the driver is configured to:

simultaneously stop an application of a voltage to the drive transistor of each of the luminescence pixels included in the $k^{th}$ drive block;

simultaneously apply a reference voltage from the first signal line to the drive transistor gate of each of the luminescence pixels included in the $k^{th}$ drive block;

simultaneously apply an initializing voltage from one of the first control lines to the drive transistor source of each of the luminescence pixels included in the $k^{th}$ drive block;

simultaneously apply a predetermined voltage to the drive transistor drain of each of the luminescence pixels included in the $k^{th}$ drive block, by applying a voltage for turning ON the fourth switch of each of the luminescence pixels included in the $k^{th}$ drive block to the corresponding one of the second control lines;

stop the application of the predetermined voltage to the drive transistor drain of each of the luminescence pixels included in the $k^{th}$ drive block, by applying a voltage for turning OFF the fourth switch of each of the luminescence pixels included in the $k^{th}$ drive block to the corresponding one of the second control lines;

simultaneously cause a non-conductive state between the first signal line and the drive transistor gate of each of the luminescence pixels included in the $k^{th}$ drive block, by applying a voltage for turning OFF the first switch of each of the luminescence pixels included in the $k^{th}$ drive block to corresponding ones of the scanning lines;

simultaneously stop an application of a voltage to the drive transistor of each of the luminescence pixels included in the $(k+1)^{th}$ drive block;

simultaneously apply the reference voltage from the second signal line to the drive transistor gate of each of the luminescence pixels included in the $(k+1)^{th}$ drive block;

simultaneously apply the initializing voltage from another of the first control lines to the drive transistor source of each of the luminescence pixels included in the $(k+1)^{th}$ drive block;

simultaneously apply a predetermined voltage to the drive transistor drain of each of the luminescence pixels included in the $(k+1)^{th}$ drive block, by applying the voltage for turning ON the fourth switch of each of the luminescence pixels included in the $(k+1)^{th}$ drive block to the corresponding one of the second control lines;

simultaneously stop the application of the predetermined voltage to the drive transistor drain of each of the luminescence pixels included in the $(k+1)^{th}$ drive block, by applying the voltage for turning OFF the fourth switch of each of the luminescence pixels included in the $(k+1)^{th}$ drive block to the corresponding one of the second control lines; and simultaneously cause a non-conductive state between the second signal line and the drive transistor gate of each of the luminescence pixels included in the $(k+1)^{th}$ drive block, by applying the voltage for turning OFF the second switch of each of the luminescence pixels included in the $(k+1)^{th}$ drive block to corresponding ones of the scanning lines.

4. The image display device according to claim 2, wherein each of the second control lines is connected to the luminescence pixels in a same one of the drive blocks and not connected to the luminescence pixels in different ones of the drive blocks.

5. The image display device according to claim 2, wherein the fourth switch is a switching transistor that includes one of the fourth switch source and the fourth switch drain being connected to the other of the driving transistor source and the driving transistor drain, and the other of the fourth switch source and the fourth switch drain being connected to the first power source line.

6. The image display device according to claim 1, wherein, where a period of time for rewriting all of the luminescence pixels is Tf, and a total number of the drive blocks is N, a period of time for detecting a threshold voltage of the drive transistor is at most Tf/N.

7. A method of driving an image display device in which luminescence pixels are arranged in rows and columns and compose at least two drive blocks, each of the drive blocks including luminescence pixels in at least two of the rows, the image display device including:

a first power source line and a second power source line;

a first signal line and a second signal line for supplying the luminescence pixels with a final voltage that determines luminance of the luminescence pixels;

a signal line driver that outputs the signal voltage to the first signal line and the second signal line;

a timing controller that controls a timing at which the signal line driver outputs the signal voltage;

scanning lines, each for one of the rows; and first control lines, each of the luminescence pixels including:

a luminescence element that includes luminescence terminals, one of the luminescence terminals being connected to the second power source line, the luminescence element producing a luminance according to a flow of a signal current corresponding to the final voltage; and a current controller connected to the first power source line, another of the luminescence terminals, and a corresponding one of the first control lines, the current controller being configured to convert the signal voltage into the signal current, the current controller including:

a drive transistor that includes one of a drive transistor source and a drive transistor drain that is connected to the other of the luminescence terminals and converts the signal voltage applied between a drive transistor gate and the drive transistor source into a drain current;

a first capacitor that includes first capacitor terminals, one of the first capacitor terminals being connected to the drive transistor gate, the other of the first capacitor terminals being connected to the drive transistor source; and a second capacitor that includes second capacitor terminals, one of the second capacitor terminals being connected to the drive transistor source, the other of the second capacitor terminals being connected to the corresponding one of the first control lines;

each of the luminescence pixels in a $k^{th}$ one of the drive blocks further including:

a first switch being a switching transistor and including a first switch gate connected to a corresponding one of the scanning lines, one of a first switch source and a first switch drain being connected to the first signal line, and another of the first switch source and the first switch drain being connected to the drive transistor of the current controller, the first switch switchably interconnecting the first signal line and the current controller, each of the luminescence pixels that belong to a $(k+1)^{th}$ one of the drive blocks further including:

a second switch being a switching transistor and including a second switch gate connected to a corresponding one of the scanning lines, one of a second switch source and a second switch drain being connected to the second signal line, and another of the second switch source and the second switch drain being connected to the drive transistor gate of the current controller, the second switch switchably interconnecting the second signal line and the current controller, each of the first control lines being connected to the luminescence pixels in a same one of the drive blocks and not connected to the luminescence pixels in different ones of the drive blocks, k being a positive integer, a threshold voltage correction period of the $(k+1)^{th}$ drive block being provided in a signal voltage storing period of the $k^{th}$ drive block, the signal voltage including a luminance signal voltage for causing the luminescence element to produce the luminescence, and a reference voltage for causing the first capacitor to store a voltage corresponding to a threshold voltage of the drive transistor, and the timing controller being configured to mutually and exclusively output the luminance final voltage and the reference voltage to the first signal line and the second signal line, the method comprising:

holding a first voltage corresponding to a first threshold voltage of a corresponding drive transistor, simultaneously, in the current controller of each of the luminescence pixels included in a $k^{th}$ drive block of the drive blocks;

holding a summed voltage, in a luminescence pixel row-sequence, in the current controller of each of the luminescence pixels included in the $k^{th}$ drive block, after the holding of the first voltage in the $k^{th}$ drive block, the summed voltage being obtained by adding the luminance signal voltage to the first voltage corresponding to the first threshold voltage; and holding a second voltage corresponding to a second threshold voltage of a corresponding drive transistor, simultaneously, in the current controller of each of the luminescence pixels included in a $(k+1)^{th}$ drive block of the drive blocks, after the holding of the first voltage in the $k^{th}$ drive block, wherein a period for the holding of the second voltage in the $(k+1)^{th}$ drive block is provided in a period for the holding of the summed voltage in the $k^{th}$ drive block.

8. The method according to claim 7, further comprising:

in the holding of the first voltage in the $k^{th}$ drive block, the first voltage corresponding to the first threshold voltage of the corresponding drive transistor is held simultaneously in the first capacitor of each of the luminescence pixels included in the $k^{th}$ drive block, in the holding of the summed voltage in the $k^{th}$ drive block, the summed voltage is held, in the luminescence pixel row-sequence, in the first capacitor of each of the luminescence pixels included in the $k^{th}$ block, and in the holding of the second voltage in the $(k+1)^{th}$ drive block, the second voltage corresponding to the second threshold voltage of the corresponding drive transistor is held simultaneously in the first capacitor of each of the luminescence pixels included in the $(k+1)^{th}$ drive block.

9. The method according to claim 8, further comprising:

producing the luminescence by simultaneously supplying the signal current, as the drain current of the drive transistor, to the luminescence element of each of the luminescence pixels included in the $k^{th}$ drive block, after the holding of the first voltage in the $k^{th}$ drive block.

10. The method according to claim 9, further comprising:

holding a second summed voltage, the luminescence pixel row-sequence, in the first capacitor of each of the luminescence pixels included in the $(k+1)^{th}$ drive block, after the holding of the second voltage in the $(k+1)^{th}$ drive block, the summed voltage being obtained by adding the luminance signal voltage to the second voltage corresponding to the second threshold voltage; and producing the luminescence by simultaneously supplying the signal current, as the drain current of the drive transistor, to the luminescence element of each of the luminescence pixels included in the $(k+1)^{th}$ drive block, after the holding of the second summed voltage in the $(k+1)^{th}$ drive block.

11. The method according to claim 10, wherein the holding of the first voltage in the $k^{th}$ drive block includes:

simultaneously stopping the application of the voltage to the drive transistor of each of the luminescence pixels included in the $k^{th}$ drive block;

simultaneously applying the reference voltage from the first signal line to the drive transistor gate of each of the luminescence pixels included in the $k^{th}$ drive block, after simultaneously stopping the application of the voltage in the $k^{th}$ drive block;

simultaneously applying an initializing voltage, from the first control lines, each provided for one of the rows of the luminescence pixels, to the drive transistor source of each of the luminescence pixels included in the $k^{th}$ drive block, after simultaneously applying the reference voltage in the $k^{th}$ drive block;

simultaneously applying a predetermined voltage to the drive transistor drain of each of the luminescence pixels included in the $k^{th}$ drive block, after simultaneously applying the initializing voltage in the $k^{th}$ block; and stopping the applying the predetermined voltage to the drive transistor drain of each of the luminescence pixels included in the $k^{th}$ drive block, and simultaneously causing a non-conductive state between the first signal line and the drive transistor gate of each of the luminescence pixels included in the $k^{th}$ drive block, after simultaneously applying the predetermined voltage in the $k^{th}$ drive block, and the holding of the second voltage in the $(k+1)^{th}$ drive block includes:

simultaneously stopping application of voltage to the drive transistor of each of the luminescence pixels included in the $(k+1)^{th}$ drive block;

simultaneously applying the reference voltage from the second signal line different from the first signal line to the drive transistor gate of each of the luminescence pixels included in the $(k+1)^{th}$ drive block, after simultaneously stopping the application of the voltage in the $(k+1)^{th}$ drive block;

simultaneously applying the initializing voltage from the first control lines to the drive transistor source of each of the luminescence pixels included in the $(k+1)^{th}$ drive block, after simultaneously applying the reference voltage in the $(k+1)^{th}$ drive block;

simultaneously applying the predetermined voltage to the drive transistor drain of each of the luminescence pixels included in the $(k+1)^{th}$ drive block, after simultaneously applying the initializing voltage in the $(k+1)^{th}$ drive block; and stopping the applying the predetermined voltage to the drive transistor drain of each of the luminescence pixels included in the $(k+1)^{th}$ drive block, and simultaneously causing a non-conductive state between the second signal line and the drive transistor gate of each of the luminescence pixels included in the $(k+1)^{th}$ drive block, after simultaneously applying the predetermined voltage in the $(k+1)^{th}$ drive block.

12. The method according to claim 11, in simultaneously stopping the application of the voltage in the $k^{th}$ drive block and simultaneously stopping the application of the voltage in the $(k+1)^{th}$ drive block, the application of the voltage to the drive transistor of each of the luminescence pixels is stopped by causing the first switching transistor to be non-conductive, in simultaneously applying the reference voltage in the $k^{th}$ drive block, the reference voltage is applied from the first signal line to the drive transistor gate of each of the luminescence pixels included in the $k^{th}$ drive block by causing the second switching transistor to be conductive, in simultaneously applying the reference voltage in the $(k+1)^{th}$ drive block, the reference voltage is applied from the second signal line to the drive transistor gate of each of the luminescence pixels included in the $(k+1)^{th}$ drive block by causing a third switching transistor to be conductive, the third switching transistor including a third switch gate connected to a corresponding one of the scanning lines, one of a third switch source and a third switch drain being connected to the second signal line, and the other of the third switch source and the third switch drain being connected to the drive transistor gate, in simultaneously applying the initializing voltage in the $k^{th}$ drive block and simultaneously applying the initializing voltage in the $(k+1)^{th}$ drive block, the initializing voltage is applied from the first control lines to the drive transistor source of each of the luminescence pixels, in simultaneously applying the predetermined voltage in the $k^{th}$ drive block and simultaneously applying the predetermined voltage in the $(k+1)^{th}$ drive block, the predetermined voltage is applied to the drive transistor drain of each of the luminescence pixels by causing the first switching transistor of each of the luminescence pixels to be conductive, in stopping the application of the predetermined voltage in the $k^{th}$ drive block, the application of the predetermined voltage to the drive transistor drain of each of the luminescence pixels included in the $k^{th}$ drive block is stopped by causing the first switching transistor of each of the luminescence pixels included in the $k^{th}$ drive block to be non-conductive, and the non-conductive state between the first signal line and the drive transistor gate of each of the luminescence pixels included in the $k^{th}$ drive block is caused by causing the second switching transistor of each of the luminescence pixels included in the $k^{th}$ drive block to be non-conductive, in stopping the application of the predetermined voltage in the $(k+1)^{th}$ drive block, the application of the predetermined voltage to the drive transistor drain of each of the luminescence pixels included in the $(k+1)^{th}$ drive block is stopped by causing the first switching transistor of each of the luminescence pixels included in the $(k+1)^{th}$ drive block to be non-conductive, and the non-conductive state between the second signal line and the drive transistor gate of each of the luminescence pixels included in the $(k+1)^{th}$ drive block is caused by causing the third switching transistor of each of the luminescence pixels included in the $(k+1)^{th}$ drive block to be non-conductive, in holding the summed voltage in the $k^{th}$ drive block, the luminance signal voltage is applied from the first signal line to the drive transistor gate of each of the luminescence pixels included in the $k^{th}$ drive block by causing the second switching transistor of each of the luminescence pixels included in the $k^{th}$ drive block to be conductive, in holding the second summed voltage in a $(k+1)^{th}$ drive block, the luminance signal voltage is applied from the second signal line to the drive transistor gate of each of the luminescence pixels included in the $(k+1)^{th}$ drive block by causing the third switching transistor of each of the luminescence pixels included in the $(k+1)^{th}$ drive block to be conductive, and in producing of luminescence in the $k^{th}$ drive block and the producing of luminescence in the $(k+1)^{th}$ drive block, the predetermined voltage is applied to the drive transistor drain of each of the luminescence pixels so that the signal current is supplied to the luminescence element of each of the luminescence pixels, by causing the first switching transistor of each of the luminescence pixels to be conductive.

13. An image display device including luminescence pixels arranged in rows and columns, the image display device comprising:

a first power source line and a second power source line;

a first signal line and a second signal line for supplying the luminescence pixels with a signal voltage that determines luminance of the luminescence pixels;

scanning lines, each for one of the rows;

first control lines;

a signal line driver that outputs the signal voltage to the first signal line and the second signal line; and a timing controller that controls a timing at which the signal line driver outputs the signal voltage, wherein the luminescence pixels compose at least two drive blocks, each including luminescence pixels in at least two of the rows, each of the luminescence pixels includes:

a luminescence element that includes luminescence terminals, one of the luminescence terminals being connected to the second power source line, the luminescence element producing a luminance according to a flow of a signal current corresponding to the signal voltage; and a current controller connected to the first power source line, another of the luminescence terminals, and a corresponding one of the first control lines, the current controller being configured to convert the signal voltage into the signal current, the current controller includes:

a driver that includes one of a driver source and a driver drain that is connected to the other of the luminescence terminals and converts the signal voltage applied between a driver gate and the driver source into the signal current; and a capacitor that includes capacitor terminals, one of the capacitor terminals being connected to the driver gate, each of the luminescence pixels in a $k^{th}$ one of the drive blocks further includes:

a first switch including a first switch gate connected to a corresponding one of the scanning lines, one of a first switch source and a first switch drain being connected to the first signal line, and another of the first switch source and the first switch drain being connected to the current controller, the first switch switchably interconnecting the first signal line and the current controller, each of the luminescence pixels that belong to a $(k+1)^{th}$ one of the drive blocks further includes:

a second switch including a second switch gate connected to a corresponding one of the scanning lines, one of a second switch source and a second switch drain being connected to the second signal line, and another of the second switch source and the second switch drain being connected to the current controller, the second switch switchably interconnecting the second signal line and the current controller, each of the first control lines is connected to the luminescence pixels in a same one of the drive blocks and not connected to the luminescence pixels in different ones of the drive blocks, k is a positive integer, the signal voltage includes a luminance signal voltage for causing the luminescence element to produce the luminescence, and a reference voltage for causing the capacitor to store a voltage corresponding to a threshold voltage of the driver, and the timing controller is configured to mutually and exclusively output the luminance signal voltage and the reference voltage to the first signal line and the second signal line.

14. The image display device according to claim 13, wherein the first switch is a switching transistor, and the other of the first switch source and the first switch drain is connected to the driver gate, the second switch is a switching transistor, and the other of the second switch source and the second switch drain is connected to the driver gate, the capacitor includes a first capacitor and a second capacitor, the first capacitor including first capacitor terminals, one of the first capacitor terminals being connected to the driver gate, the other of the first capacitor terminals being connected to the driver source, and the second capacitor includes second capacitor terminals, one of the second capacitor terminals being connected to the driver source, the other of the second capacitor terminals being connected to the corresponding one of the first control lines.

* * * * *